US012645324B2

(12) United States Patent
Lee et al.

(10) Patent No.: US 12,645,324 B2
(45) Date of Patent: Jun. 2, 2026

(54) OBJECT SENSING DEVICE AND A DISPLAY DEVICE FOR PROVIDING A DRIVING SIGNAL TO DIVISION BLOCKS

(71) Applicant: LX SEMICON CO., LTD., Daejeon (KR)

(72) Inventors: Jae Hwan Lee, Daejeon (KR); Jeong Kwon Nam, Daejeon (KR); Yeon Ju Yu, Daejeon (KR); Jun Young Lee, Daejeon (KR); Jin Yoon Jang, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/792,096

(22) Filed: Aug. 1, 2024

(65) Prior Publication Data

US 2025/0068281 A1     Feb. 27, 2025

(30) Foreign Application Priority Data

Aug. 23, 2023     (KR) ......................... 10-2023-0110310

(51) Int. Cl.
*G06F 3/041* (2006.01)
*G06F 3/044* (2006.01)

(52) U.S. Cl.
CPC .......... *G06F 3/0418* (2013.01); *G06F 3/0412* (2013.01); *G06F 3/0416* (2013.01); *G06F 3/044* (2013.01); *G06F 2203/04111* (2013.01)

(58) Field of Classification Search
CPC .. G06F 3/0412; G06F 3/04166; G06F 3/0418; G06F 3/0416; G06F 2203/04111; G06F 3/044

See application file for complete search history.

(56) References Cited

U.S. PATENT DOCUMENTS

| | | | |
|---|---|---|---|
| 11,073,938 B2 | 7/2021 | Weng et al. | |
| 2014/0292709 A1* | 10/2014 | Mizuhashi | G06F 3/0446 345/174 |
| 2016/0202829 A1 | 7/2016 | Choi et al. | |
| 2019/0385551 A1 | 12/2019 | Kim et al. | |
| 2020/0167537 A1* | 5/2020 | Lee | G06F 3/044 |

FOREIGN PATENT DOCUMENTS

KR     10-2018-0003734 A     1/2018

OTHER PUBLICATIONS

Extended European Search Report issued for European Patent Application No. 24175385.4 on Oct. 15, 2024, 8 page.

* cited by examiner

*Primary Examiner* — Yaron Cohen
(74) *Attorney, Agent, or Firm* — ROTHWELL, FIGG, ERNST & MANBECK, P.C.

(57) ABSTRACT

The object sensing device can include a plurality of first division blocks divided along a first direction, and a sensing driving device that drives the plurality of first division blocks. The sensing driving device can provide a first driving signal to two or more first division blocks among the plurality of first division blocks and provide a second driving signal to the remaining first division blocks. The first driving signal and the second driving signal can be different.

18 Claims, 16 Drawing Sheets

|      | CODE |   |   |   | SL11 | SL12 | SL13 | SL14 |
|------|---|---|---|---|------|------|------|------|
| 1ch  | 1 | 1 | 1 | 0 | STX1 | STX1 | STX1 | STX2 |
| 2ch  | 1 | 1 | 0 | 1 | STX1 | STX1 | STX2 | STX1 |
| 3ch  | 1 | 0 | 1 | 1 | STX1 | STX2 | STX1 | STX1 |
| 4ch  | 0 | 1 | 1 | 1 | STX2 | STX1 | STX1 | STX1 |

OBJECT SENSING DEVICE AND A DISPLAY DEVICE FOR PROVIDING A DRIVING SIGNAL TO DIVISION BLOCKS

CROSS-REFERENCE TO RELATED APPLICATIONS

The present application claims the benefits of priority to Korean Patent Application No. 10-2023-0110310, filed on Aug. 23, 2023, which is incorporated herein by reference in its entirety.

BACKGROUND

1. The Field

The embodiment relates to an object sensing device and a display device.

2. Description of the Related Art

Recently, a display device with an object sensing function that can recognize a touch by an object or the proximity of an object has been widely used. The display device has various sizes, such as small electronic device (e.g., smartphone) or large electronic device (e.g., TV, kiosk, or electronic whiteboard).

The display device includes a plurality of sensing cells provided on a panel. The display device displays an image on the panel and performs object sensing using the plurality of sensing cells.

Meanwhile, coupling capacitance is formed between the sensing cell and the pixel of the panel. When a driving signal is provided to the sensing cell to implement an object sensing function, a data signal provided to the pixel of the panel is deformed due to the driving signal. There is a problem that display artifacts, which are a phenomenon in which image quality deteriorates, occur due to the deformation of such data signal.

SUMMARY

An object of the embodiment is to solve the foregoing and other problems.

Another object of the embodiment is to provide an object sensing device and a display device that can improve display artifacts.

The technical problems of the embodiments are not limited to those described in this item and include those that can be understood through the description of the invention.

According to a first aspect of the embodiment to achieve the above or other objects, an object sensing device, comprising: a plurality of first division blocks divided along a first direction; and at least one sensing driving device configured to drive the plurality of first division blocks, wherein the at least one sensing driving device is configured to: provide a first driving signal to two or more first division blocks among the plurality of first division blocks and provide a second driving signal to the remaining first division blocks, and wherein the first driving signal and the second driving signal are different.

The first driving signal and the second driving signal can have polarities inverted from each other.

The first driving signal and the second driving signal can be symmetrical to each other with respect to a reference signal.

The plurality of first division blocks each can comprise a plurality of second division blocks arranged along the first direction, and the plurality of second division blocks each can comprise a plurality of sensing cells arranged in a second direction crossing the first direction.

The sensing driving device can drive each of the plurality of first division blocks using a time division multiplexing method.

When using the time division multiplexing method, the sensing driving device can sequentially drive the plurality of first division blocks from a first side to a second side.

When using the time division multiplexing method, the sensing driving device can sequentially drive some of the first division blocks from a first side to a second side and sequentially drive the remaining first division blocks from the second side to the first side.

The sensing driving device can drive each of the plurality of first division blocks using a code division multiplexing method.

When using the code division multiplexing method, at least one second division block among the plurality of second division blocks of each of the plurality of first division blocks can provide the first driving signal, and the remaining second division blocks can provide the second driving signal, for each of a plurality of channels.

The object sensing device can comprise a plurality of third division blocks each corresponding to the plurality of first division blocks, and the sensing driving device can drive the plurality of first division blocks through the plurality of third division blocks.

The plurality of third division blocks each can comprise a plurality of sensing lines, the plurality of sensing lines each can be connected to the plurality of second division blocks, and the sensing driving device can provide the first driving signal or the second driving signal to the plurality of sensing cells in each of the plurality of second division blocks.

The sensing driving device can comprise a plurality of sensing driving devices each corresponding to the plurality of first division blocks.

According to a second aspect of the embodiment to achieve the above or other objects, a display device, comprising: a panel comprising a plurality of first division blocks divided along a first direction; and a sensing driving device configured to drive the plurality of first division blocks, wherein the sensing driving device is configured to: provide a first driving signal to two or more first division blocks among the plurality of first division blocks and provide a second driving signal to the remaining first division blocks, and wherein the first driving signal and the second driving signal are different.

The first driving signal and the second driving signal can have polarities inverted from each other.

The first driving signal and the second driving signal can be symmetrical to each other with respect to a reference signal.

The plurality of first division blocks each can comprise a plurality of second division blocks arranged along the first direction, and the plurality of second division blocks each can comprise a plurality of sensing cells arranged in a second direction crossing the first direction.

The effects of the object sensing device and the display device according to the embodiment are described as follows.

According to at least one of the embodiments, a first driving signal can be provided to two or more first division blocks among a plurality of first division blocks capable of recognizing a touch by an object or the proximity of an object, and a second driving signal can be provided to the remaining first division blocks. Accordingly, the change in the data signal provided to each pixel of the display panel due to the coupling capacitance between the sensing panel and the display panel is alleviated or minimized, so that display artifacts can be improved.

According to at least one of the embodiments, a first driving signal or a second driving signal can be provided to a plurality of second division blocks included in each of the plurality of first division blocks. That is, the same driving signal can be provided to the plurality of second division blocks included in each of the plurality of first division blocks. Accordingly, the number of times the first driving signal or the second driving signal is generated can be reduced, thereby dramatically reducing power consumption and reducing the computational burden on the sensing driving device.

BRIEF DESCRIPTION OF THE DRAWINGS

FIG. 16 is a table of an example of a code division multiplexing method for driving second-first to second-fourth division blocks of a first-first division block according to the fourth embodiment.

DETAILED DESCRIPTION

Figure 1:
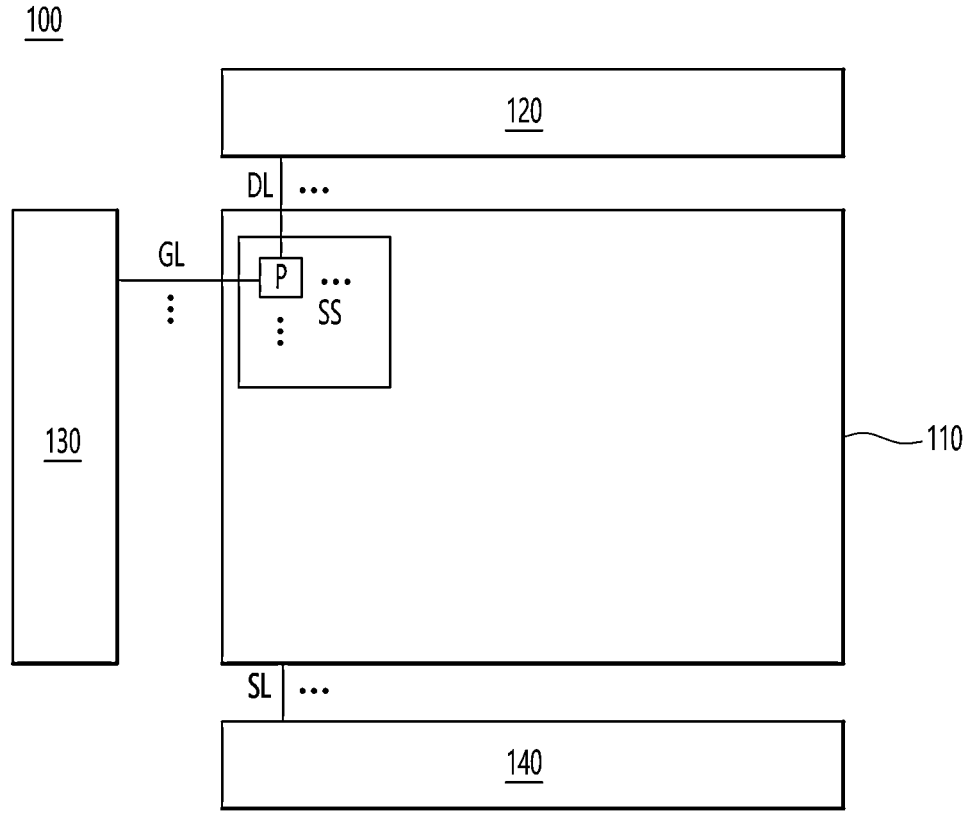
FIG. 1 is a configuration diagram of a display device according to an embodiment.

Hereinafter, the embodiment disclosed in this specification will be described in detail with reference to the accompanying drawings, but the same or similar elements are given the same reference numerals regardless of reference numerals, and redundant descriptions thereof will be omitted. The suffixes 'module' and 'unit' for the elements used in the following descriptions are given or used interchangeably in consideration of ease of writing the specification, and do not themselves have a meaning or role that is distinct from each other. In addition, the accompanying drawings are for easy understanding of the embodiment disclosed in this specification, and the technical idea disclosed in this specification is not limited by the accompanying drawings. Also, when an element such as a layer, region or substrate is referred to as being 'on' another element, this means that there can be directly on the other element or be other intermediate elements therebetween.

FIG. 1 is a configuration diagram of a display device according to an embodiment.

Referring to FIG. 1, the display device 100 according to an embodiment can comprise a panel 110, a data driving device 120, a gate driving device 130, and a sensing driving device 140.

In an embodiment, the panel 110 can comprise a liquid crystal display panel, an organic light emitting display panel, etc., but is not limited thereto.

The panel 110 can comprise a plurality of gate lines GL, a plurality of data lines DL, and a plurality of pixels P. The plurality of gate lines GL can be connected to the gate driving device 130. The plurality of data lines DL can be connected to the data driving device 120. The plurality of pixels P can be connected to the plurality of gate lines GL and the plurality of data lines DL.

The sensing cell SS can comprise at least one sensing electrode. The sensing electrode can comprise a first sensing electrode and a second sensing electrode, but is not limited thereto. A predetermined capacitance can be formed between the first sensing electrode and the second sensing electrode. A driving signal can be provided to the first sensing electrode, and a sensing signal can be output from the second sensing electrode. When an object touches the sensing cell SS or an object approaches the sensing cell SS, the capacitance between the first sensing electrode and the second sensing electrode can change, and the changed capacitance can be output from the second sensing electrode as a sensing signal. The object can comprise hands, fingers, pens, etc. the object sensing can be performed by using only one sensing electrode instead of dividing a sensing electrode into a first sensing electrode and a second sensing electrode.

The display panel and the sensing panel can share some components with each other. As an example, the display panel and the sensing panel can share an upper substrate.

As another example, the sensing electrode constituting the sensing cell SS in the sensing panel and the common electrode constituting the pixel P in the display panel can be shared with each other.

As another example, the sensing electrodes constituting the plurality of sensing cells SS in the sensing panel and the common electrodes constituting the pixels P in the display panel can be provided independently without being shared with each other.

The gate driving device 130 can sequentially provide scan signals to a plurality of gate lines GL to turn on or off transistors included in the pixels P.

Depending on a driving method, the gate driving device 130 can be provided on only one side of the panel 110 as shown in this drawing, or can be divided into two and provided on both sides of the panel 110.

The data driving device 120 can convert a data signal provided from an external source, for example, a host, into an analog data voltage and provide the analog data voltage to a plurality of pixels P of the panel 110 to display an image.

The sensing driving device 140 can supply a driving signal to all or part of the plurality of sensing cells SS connected to a plurality of sensing lines SL. Although not shown, the sensing line SL can comprise a first sensing line and a second sensing line. For example, the first sensing line can be connected to the first sensing electrode of the sensing cell SS, and the second sensing line can be connected to the second sensing electrode of the sensing cell SS. The first sensing line can provide a driving signal generated by the sensing driving device 140 to the first sensing electrode of the sensing cell SS. The second sensing line can provide a sensing signal output from the second sensing electrode of the sensing cell SS to the sensing driving device 140. The first sensing line can be called a transmission sensing line, and the second sensing line can be called a reception sensing line. An object sensing can be performed by providing only one sensing line instead of dividing a sensing line into a first sensing line and a second sensing line.

As an example, the sensing driving device 140 can be configured separately from the data driving device 120 and the gate driving device 130. For example, the data driving device 120, the gate driving device 130, and the sensing driving device 140 can each be configured as individually an integrated circuit. As another example, depending on the implementation method, the sensing driving device 140 can be included in the data driving device 120 or the gate driving device 130. As another example, the data driving device 120, the gate driving device 130, and the sensing driving device 140 can be configured as one integrated circuit.

This sensing drive device 140 is not limited in implementation and design method, and can be a different configuration itself or can be provided inside or outside of another configuration as long as the function performed is the same or similar in the embodiment.

Although one sensing driving device 140 is provided in the drawing, two or more sensing driving devices 140 can be provided.

Meanwhile, the display device 100 can adopt a capacitance type object sensing method that recognizes a touch or proximity of an object by detecting changes in capacitance through the sensing cell SS.

As an example, the capacitance type object sensing method can be divided into a mutual-capacitance type object sensing method and a self-capacitance type object sensing method.

The display device 100 can adopt one of the two types of capacitance type object sensing methods described above, that is, the mutual capacitance type object sensing method and the self-capacitance type object sensing method. Hereinafter, for convenience of explanation, embodiments will be described assuming that a mutual capacitance type object sensing method is adopted.

Figure 2:
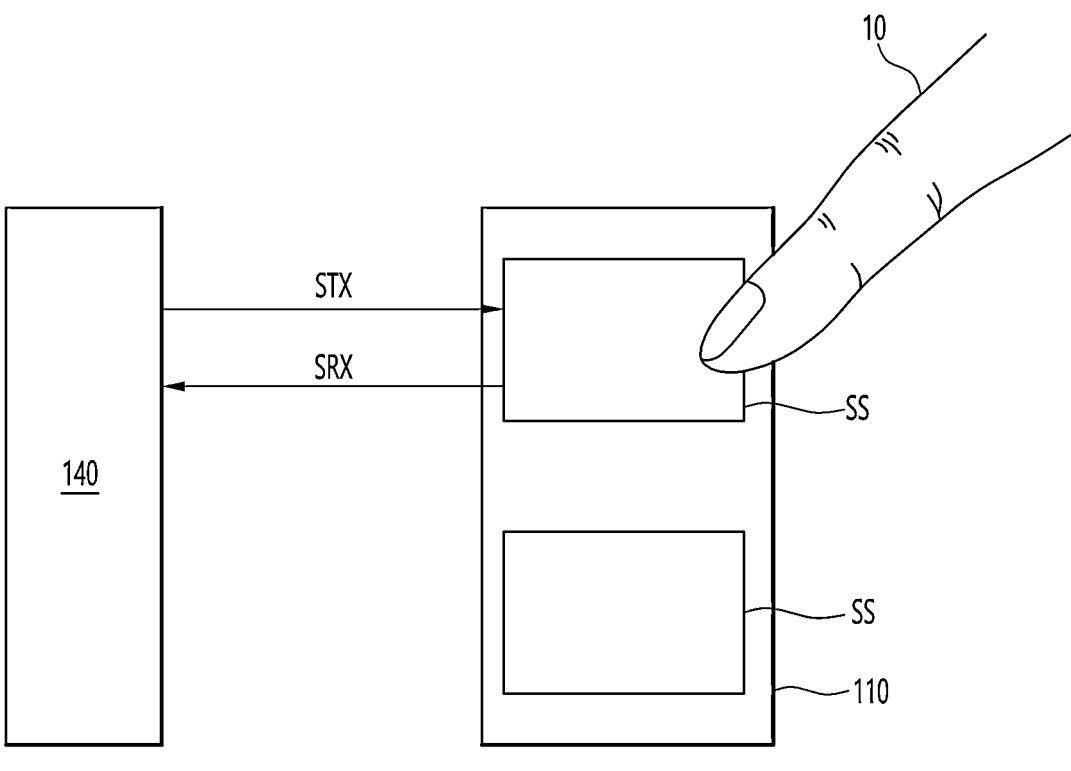
FIG. 2 shows the sensing driving device and panel of FIG. 1.

FIG. 2 shows the sensing driving device and panel of FIG. 1.

Referring to FIG. 2, the sensing driving device 140 can supply a driving signal STX to the sensing cell SS on the panel 110.

The driving signal STX can be a voltage signal or a current signal. The driving signal STX can have a pulse-shaped waveform. The pulse-shaped waveform can be of various types, such as a stationary wave or a square wave. Hereinafter, for convenience of explanation, embodiments will be described assuming that a driving signal STX having a square wave is adopted.

The sensing driving device 140 can receive a sensing signal SRX for the driving signal STX from the sensing cell SS of the panel 110. The sensing driving device 140 can demodulate the received sensing signal SRX, sense a touch or proximity of the object 10 to the panel 110, and detect the presence or absence of the object, object coordinates, etc. The sensing signal SRX can be a voltage signal or a current signal. The driving signal STX can have a pulse-shaped waveform. The pulse-shaped waveform can be of various types, such as a stationary wave or a square wave.

Figure 3:
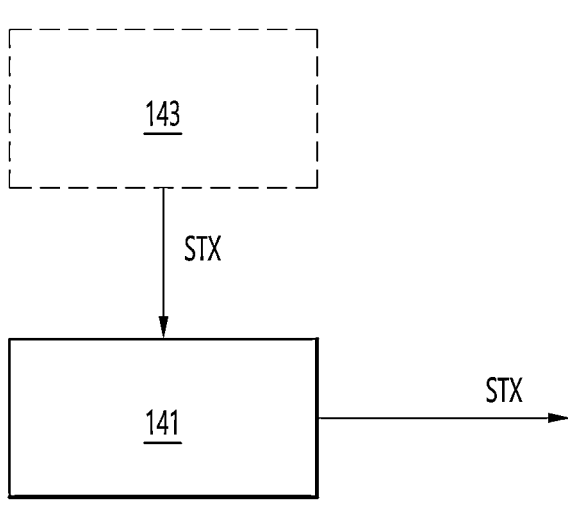
FIG. 3 is a configuration diagram of the sensing driving device of FIG. 2.
Figure 3:
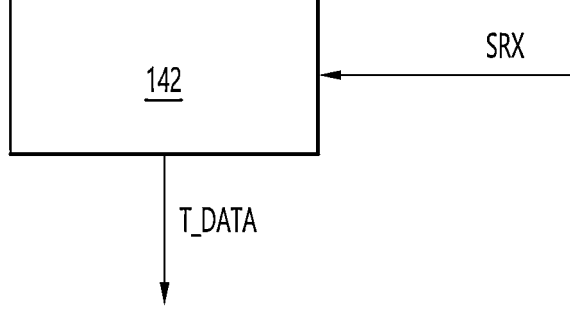

FIG. 3 is a configuration diagram of the sensing driving device of FIG. 2.

Referring to FIGS. 2 and 3, the sensing driving device 140 can comprise a driving circuit 141 and a sensing circuit 142. The driving circuit 141 and/or the sensing circuit 142 can be configured as an integrated circuit. The driving circuit 141 and the sensing circuit 142 can be integrated into one integrated circuit or into individual integrated circuits.

The driving circuit 141 can provide a driving signal STX to the sensing cell SS on the panel 110. For example, the driving circuit 141 can supply the driving signal STX to one or more sensing cells SS connected to each of a plurality of first sensing lines on the panel 110, but is not limited thereto.

The sensing circuit 142 can receive a sensing signal SRX corresponding to the driving signal STX from one or more sensing cells SS connected to each of a plurality of second sensing lines on the panel 110. The sensing circuit 142 can sense or detect a touch or proximity of an object to the panel 110 based on the sensing signal SRX.

The sensing circuit 142 can generate sensing data T_DATA based on the sensing signal SRX.

Sensing data T_DATA can comprise a sensing value generated by demodulating the sensing signal SRX. For example, the sensing value can be a time integral value of the current or voltage of the sensing signal SRX. The sensing value can be used to determine the presence or absence of the object 10 on the panel 110 or to generate object coordinates. For example, if the size of the sensing value is larger or smaller than the reference value, it can be determined that a touch by an object occurs or the object is close.

Meanwhile, the sensing driving device 140 can comprise a signal generator 143.

The signal generator 143 can generate a driving signal STX supplied to the sensing cell SS on the panel 110. The driving circuit 141 can receive the driving signal STX from the signal generator 143 and supply the driving signal STX to the sensing cell SS on the panel 110.

The signal generator 143 can be provided inside the sensing driving device 140, but can also be provided inside the data driving device 120 or the gate driving device 130. The signal generator 143 can be implemented through a separate integrated circuit depending on the implementation method.

Figure 4:
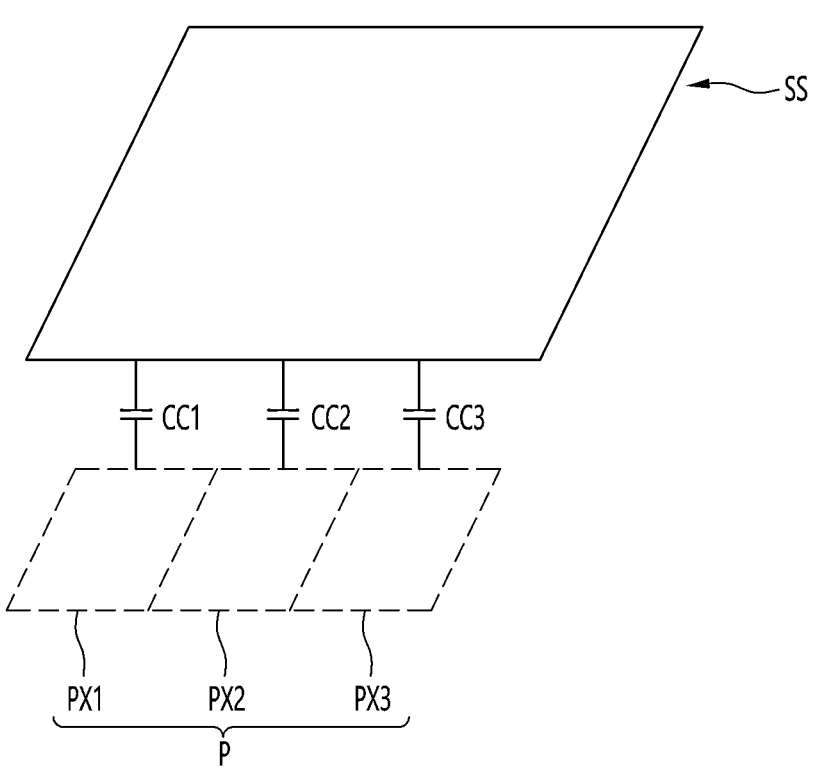
FIG. 4 shows the formation of coupling capacitance between a sensing cell and each sub-pixel.

Meanwhile, as shown in FIG. 4, coupling capacitances CC1 to CC3 can be formed between the sensing cell SS and the sub-pixels PX1 to PX3. For example, the sensing cell SS can have a size comprising at least three sub-pixels PX1 to PX3, but is not limited thereto.

As shown in FIGS. 2 and 4, a driving signal STX can be provided to the sensing cell SS, and a sensing signal SRX can be generated and output from the sensing cell SS. The pixel P can comprise a plurality of sub-pixels PX1 to PX3 to implement an image. For example, the first sub-pixel PX1 can display a red color, the second sub-pixel PX2 can display a green color, and the third sub-pixel PX3 can display a blue color.

When the driving signal STX is provided to the sensing cell SS and the sensing signal SRX is generated from the sensing cell SS, the driving signal TX and/or the sensing signal SRX can affect data signal provided to each sub-pixel PX1 to PX3 of the pixel P. That is, coupling capacitances CC1 to CC3 can each be formed between the sensing cell SS and each sub-pixel PX1 to PX3 of the pixel P. The coupling capacitances CC1 to CC3 can be different depending on the material characteristics or size of each sub-pixel PX1 to PX3.

When the driving signal STX is provided to the sensing cell SS and the sensing signal SRX is generated from the sensing cell SS, the data signal provided to each subpixel PX1 to PX3 can change due to the coupling capacitance CC1 to CC3. The changes in these data signals can cause display artifacts that deteriorate image quality.

In the above, the generation of display art is explained assuming that the sensing cell SS is provided on the panel 110, but is not limited thereto. That is, the embodiment can be applied to any device, in which the sensing cell SS is provided on a member other than the panel 110, and a coupling capacitance is formed between the sensing cell SS and the member, so that the data signal provided to the member is changed, causing defects such as data errors.

Below, various embodiments that can improve display artifacts, etc. are described. In the following description, a first division block can be referred to as a driving division block, a second division block can be referred to as a sensing block or a sensing cell block, and a third division block can be referred to as a sensing line block.

Figure 5:
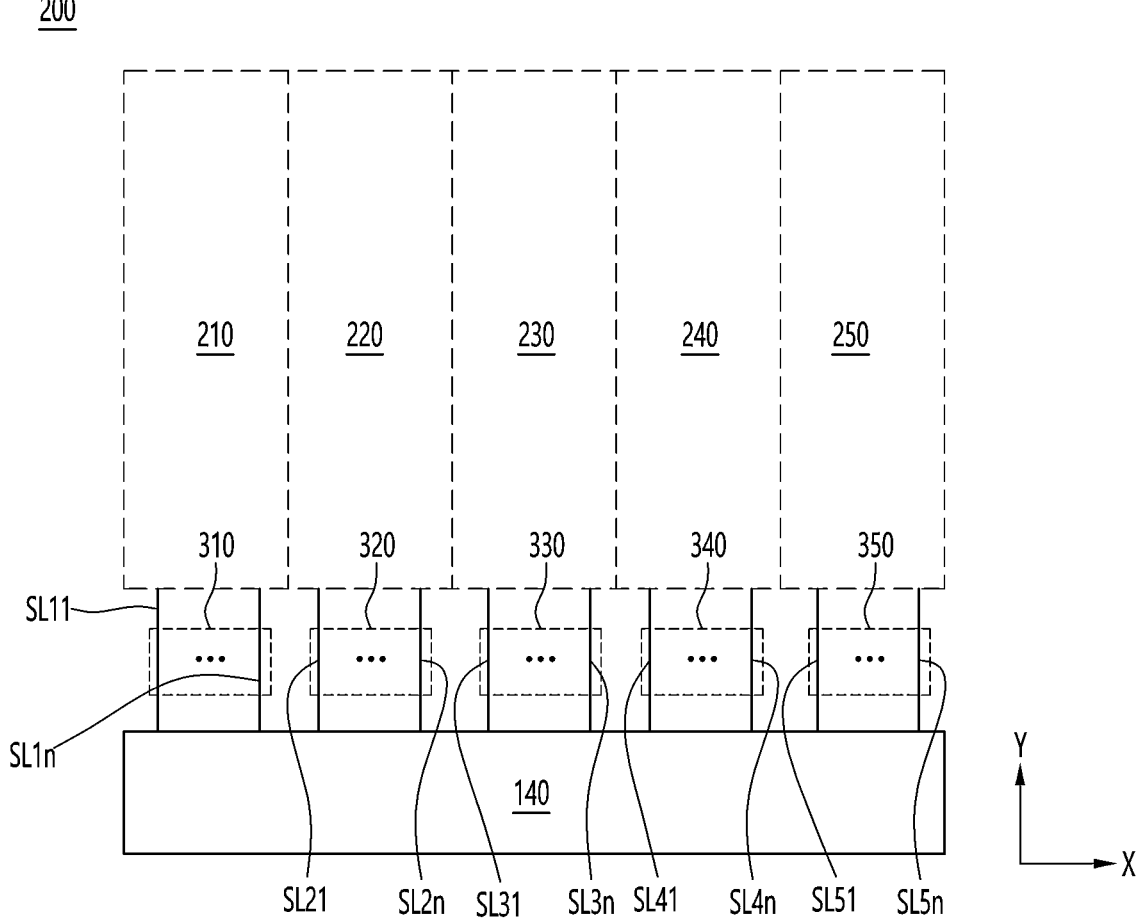
FIG. 5 shows an object sensing device according to a first embodiment.

FIG. 5 shows an object sensing device according to a first embodiment.

Referring to FIGS. 1 and 5, the object sensing device 200 according to the first embodiment can comprise a plurality of first division blocks 210 to 250 and a sensing driving device 140.

As an example, the plurality of first division blocks 210 to 250 can be provided on the panel 110. The panel 110 can comprise a display panel and/or a sensing panel. When the sensing panel is integrated with the display panel, that is, in the case of an in-cell method, the plurality of first division blocks 210 to 250 can be provided on the display panel. When the sensing panel is provided separately from the display panel, that is, when the sensing panel is an on-cell method or an add-on method, the plurality of first division blocks 210 to 250 can be provided on the sensing panel. When a coupling capacitance is formed between the sensing panel and the display panel and a recognition operation is performed regarding a touch by an object or the proximity of an object to the plurality of first division blocks 210 to 250, the data signal provided to each pixel P on the display panel can be deformed due to coupling capacitance, which causes display artifacts that deteriorate image quality.

As another example, the plurality of first division blocks 210 to 250 can be provided on a member other than the panel 110. The member can be an electronic device or a circuit board that performs a predetermined operation using data signal. In this instance, the plurality of first division blocks 210 to 250 can be provided on a sensing panel, and the sensing panel can be mounted on the member. When a coupling capacitance is formed between the member and the sensing panel and a recognition operation is performed regarding a touch by an object or the proximity of an object to the plurality of first division blocks 210 to 250, the data signal provided for a certain operation on the member can be deformed due to coupling capacitance, causing an error in the operation.

The embodiment not only improves display artifacts that occur when a plurality of first division blocks 210 to 250 are provided on a display panel, but also prevents an operation error of a member that occurs when a plurality of first division blocks 210 to 250 are provided on the member other than the display panel. Various embodiments for solving this problem are described in detail below.

The plurality of first division blocks 210 to 250 can be divided, for example, along a first direction, that is, the X-axis direction. Each of the plurality of first division blocks 210 to 250 can have a rectangular shape, but is not limited thereto. For example, the plurality of first division blocks 210 to 250 can each have a minor axis in a first direction and a long axis in a second direction, that is, the Y-axis direction.

Although five first division blocks 210 to 250 are shown in the drawing, fewer or more first division blocks can be provided.

The sensing driving device 140 can drive the plurality of first division blocks 210 to 250. The sensing driving device 140 can drive the plurality of first division blocks 210 to 250 simultaneously, but is not limited thereto. For example, the sensing driving device 140 can simultaneously drive the plurality of first division blocks 210 to 250 during one frame, but is not limited thereto. For example, the sensing driving device 140 can simultaneously provide the first driving signal (STX1 in FIGS. 7 and 8) to each of the plurality of first division blocks 210 to 250, but is not limited thereto. For example, the sensing driving device 140 can simultaneously provide the second driving signal STX2 to each of the plurality of first division blocks 210 to 250, but is not limited thereto.

The sensing driving device 140 can drive each of the plurality of first division blocks 210 to 250 to recognize objects for the plurality of first division blocks 210 to 250.

Figure 7:
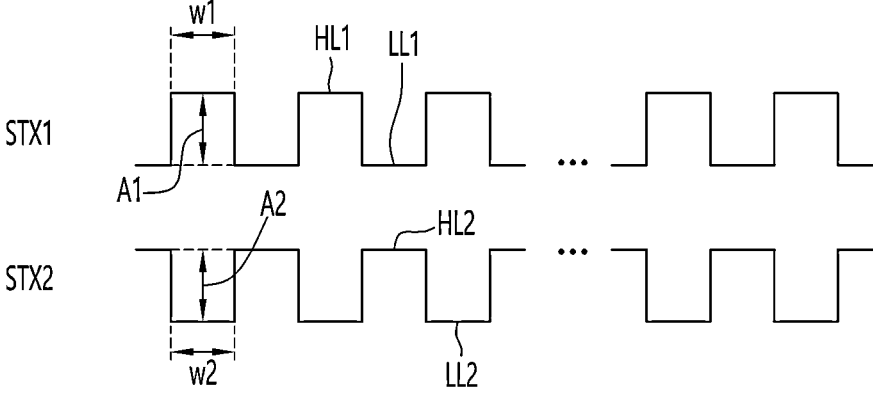
FIG. 7 is an example waveform diagram showing a first driving signal and a second driving signal.
Figure 8:
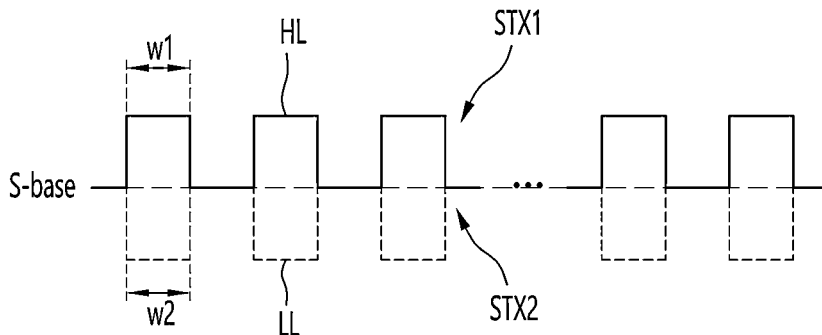
FIG. 8 is another example waveform diagram showing a first driving signal and a second driving signal.

As shown in FIGS. 7 and 8, in the embodiment, the sensing driving device 140 can provide a first driving signal STX1 to some first division blocks among the plurality of first division blocks 210 to 250 and provide a second driving signal STX2 to the remaining first division blocks. The sensing driving device 140 can receive a first sensing signal corresponding to the first driving signal STX1 from each of some first division blocks, and receive a second sensing signal corresponding to the second driving signal STX2 from each of the remaining first division blocks. The sensing driving device 140 can recognize a touch by an object or the proximity of an object based on the first sensing signal received from each of some first division blocks and the second sensing signal received from each of the remaining first division blocks. In addition, the presence or absence of an object, object coordinates, etc. can be detected based on the first sensing signal received from each of some first division blocks and the second sensing signal received from each of the remaining first division blocks.

As an example, some first division blocks can be alternately positioned with remaining first division blocks. For example, some first division blocks to which the first driving signal STX1 is provided can be a first-first division block 210, a first-third division block 230, and a first-fifth division block 250. For example, the remaining first division blocks to which the second driving signal STX2 is provided can be the first-second division blocks 220 and the first-fourth division blocks 240.

As another example, some first division blocks can be positioned adjacent to each other, and remaining first division blocks can be positioned adjacent to each other. In this instance, after some first division blocks are disposed adjacent to each other along the first direction, the remaining first division blocks can be positioned adjacent to each other along the first direction adjacent to the last first division block of some first division blocks, or vice versa. For example, some first division blocks to which the first driving signal STX1 is provided can be a first-first division block 210, a first-second division block 220, and a first-third division block 230. For example, the remaining first division blocks to which the second driving signal STX2 is provided can be the first-fourth division blocks 240 and the first-fifth division blocks 250.

As another example, some first division blocks and remaining first division blocks are positioned alternately, but two or more some first division blocks can be positioned adjacent to each other, and two or more remaining first division blocks can be positioned adjacent to each other. For example, some first division blocks to which the first driving signal STX1 is provided can be a first-first division block 210, a first-second division block 220, and a first-fifth division block 250. For example, the remaining first division blocks to which the second driving signal STX2 is provided can be the first-third division blocks 230 and the first-fourth division blocks 240.

The positional relationship between some first division blocks and remaining first division blocks can be changed in various ways.

The size of the first driving signal STX1 provided to each of some first division blocks can be the same, but is not limited thereto. The size of the second driving signal STX2 provided to each of the remaining first division blocks can be the same, but is not limited thereto.

Meanwhile, some first division blocks can be less than ¾ of the total number of the plurality of first division blocks 210 to 250. For example, the maximum number of some division blocks among the total of 20 first division blocks can be 15. In this case, among the 20 first division blocks, 15 first division blocks can be allocated to some first division blocks, and 5 first division blocks can be allocated to the remaining first division blocks. Accordingly, the first driving signal STX1 can be provided to 15 first division blocks allocated to some first division blocks, and the second driving signal STX2 can be provided to 5 first division blocks allocated to the remaining first division blocks. In contrast, the first driving signal STX1 can be provided to 10 first division blocks allocated to some first division blocks among the 20 first division blocks, and the second driving signal STX2 can be provided to 10 first division blocks allocated to the remaining division blocks.

As shown in FIGS. 7 and 8, the first driving signal STX1 can have a plurality of first pulses each having a first height A1 and a first width w1. The second driving signal STX2 can have a plurality of second pulses each having a second height A2 and a second width w2. The first width w1 and the second width w2 can be the same, but is not limited thereto. The first height A1 and the second height A2 can be the same, but is not limited thereto. The number of first pulses and the number of second pulses can be the same, but is not limited thereto.

Meanwhile, the first driving signal STX1 and the second driving signal STX2 can be different.

As an example, as shown in FIG. 7, the first driving signal STX1 and the second driving signal STX2 can have polarities inverted from each other.

In the first driving signal STX1, a first high level HL1 can be higher than a first low level LL1. In the second driving signal STX2, a second high level HL2 can be higher than a second low level LL2. The second high level HL2 of the second driving signal STX2 can be identical to or be lower than the first low level LL1 of the first driving signal STX1. For example, the first high level HL1 of the first driving signal STX1 can have a positive (+) polarity with respect to the first low level LL1. For example, the second low level LL2 of the second driving signal STX2 can have a negative (−) polarity with respect to the second high level HL2. Accordingly, the first high level HL1 of the first driving signal STX1 and the second low level LL2 of the second driving signal STX2 can have inverted polarities.

For example, when the first low level LL1 of the first driving signal STX1 or the second high level HL2 of the second driving signal STX2 is 0, the first high level HL1 of the first driving signal STX1 can be +10V and the second low level LL2 of the second driving signal STX2 can be −10V. For example, when the first low level LL1 of the first driving signal STX1 or the second high level HL2 of the second driving signal STX2 is 5V, the first high level HL1 of the first driving signal STX1 can be +10V and the second low level LL2 of the second driving signal STX2 can be 0V.

Meanwhile, it can be one example that the first high level HL1 of the first driving signal STX1 can be the first height A1 of the first pulse, and the second low level LL2 of the second driving signal STX2 can be the second height A2 of the second pulse. The first low level LL1, the first high level HL1, the second low level LL2, and the second high level HL2 can be set to various voltages depending on product specifications.

As another example, as shown in FIG. 8, the first driving signal STX1 and the second driving signal STX2 can be symmetrical to each other with respect to a reference signal S-base. The high level HL in the first driving signal STX1 can be higher than the reference signal S-base. The low level LL in the second driving signal STX2 can be lower than the reference signal S-base. The reference signal S-base is a signal with a constant level and can be ½ of the difference between the high level HL of the first driving signal STX1 and the low level LL of the second driving signal STX2. Accordingly, the first high level HL1 of the first driving signal STX1 and the second low level LL2 of the second driving signal STX2 can be symmetrical to each other with respect to the reference signal S-base. For example, the reference signal S-base can be a ground voltage or 0, but is not limited thereto.

Meanwhile, when the sensing panel comprising the plurality of first division blocks 210 to 250 is mounted on the display panel, coupling capacitance can be formed between the sensing panel and the display panel, the first driving signal STX1 or the second driving signal STX2 provided to the plurality of first division blocks 210 to 250 can have a negative effect on the data signal provided to each pixel P of the display panel due to this coupling capacitance. For example, display artifacts can occur. The display artifacts is a phenomenon in which the first driving signal STX1 or the second driving signal STX2 deteriorates the image quality by deforming the data signal provided to each pixel P of the display panel.

However, according to the embodiment, the sensing driving device 140 can provide the first driving signal STX1 to some first division blocks among the plurality of first division blocks 210 to 250 and provide the second driving signal STX2 to the remaining first division blocks, display artifacts can be improved. That is, the sensing driving device 140 does not provide the same driving signal to the plurality of first division blocks 210 to 250 but provides different driving signals, so that display artifacts can be improved by mitigating or minimizing the deformation of the data signal provided to each pixel P of the display panel.

Meanwhile, referring to FIGS. 5, 7, and 8, the object sensing device 200 according to the first embodiment can comprise a plurality of third division blocks 310 to 350. The plurality of third division blocks 310 to 350 can respectively correspond to the plurality of first division blocks 210 to 250, but are not limited thereto. For example, when the number of first division blocks 210 to 250 is five, the number of third division blocks 310 to 350 can also be five.

The sensing driving device 140 can drive the plurality of first division blocks 210 to 250 through the plurality of third division blocks 310 to 350.

The plurality of third division blocks 310 to 350 can each comprise a plurality of first sensing lines SL11 to SL1n, SL21 to SL2n, SL31 to SL3n, SL41 to SL4n, and SL51 to SL5n.

For example, the third-first division block 310 can comprise a plurality of first sensing lines SL11 to SL1n. For example, the sensing driving device 140 can provide a first driving signal STX1 or a second driving signal STX2 to the plurality of first sensing lines SL11 to SL In of the third-first division block 310.

For example, the third-second division block 320 can comprise a plurality of first sensing lines SL21 to SL2n. For example, the sensing driving device 140 can provide a first driving signal STX1 or a second driving signal STX2 to the plurality of first sensing lines SL21 to SL2n of the third-second division block 320.

For example, the third-third division block 330 can comprise a plurality of first sensing lines SL31 to SL3n. For example, the sensing driving device 140 can provide a first driving signal STX1 or a second driving signal STX2 to the plurality of first sensing lines SL31 to SL3n of the third-third division block 330.

For example, the third-fourth division block 340 can comprise a plurality of first sensing lines SL41 to SL4n. For example, the sensing driving device 140 can provide a first driving signal STX1 or a second driving signal STX2 to the plurality of first sensing lines SL41 to SL4n of the third-fourth division block 340.

For example, the third-fifth division block 350 can comprise a plurality of first sensing lines SL51 to SL5n. For example, the sensing driving device 140 can provide a first driving signal STX1 or a second driving signal STX2 to the plurality of first sensing lines SL51 to SL5n of the third-fifth division block 350.

As an example, the sensing driving device 140 can provide the first driving signal STX1 to the plurality of sensing lines SL11 to SL1n, SL31 to SL3n, and SL51 to SL5n of each of the third-first division block 310, the third-third division block 330, and the third-fifth division block 350. The sensing driving device 140 can provide the second driving signal STX2 to the plurality of sensing lines SL21 to SL2n, and SL41 to SL4n of each of the third-second division block 320 and the third-fourth division block 340. Conversely, the first driving signal STX1 and the second driving signal STX2 can be provided. That is, the first driving signal STX1 can be supplied to the plurality of first sensing lines SL21 to SL2n, and SL41 to SL4n of each of the third-second division block 320 and the third-fourth division block 340, and the second driving signal STX2 can be supplied to a plurality of first sensing lines SL11 to SL1n, SL31 to SL3n, and SL51 to SL5n.

As another example, the sensing driving device 140 can provide the first driving signal STX1 to the plurality of sensing lines SL11 to SL1n, SL21 to SL2n, and SL31 to SL3n of the third-first division block 310, the third-second division block 320, and the third-third division block 330. The sensing driving device 140 can provide the second driving signal STX2 to the plurality of first sensing lines SL41 to SL4n, and SL51 to SL5n of each of the third-fourth division blocks 340 and the third-fifth division blocks 350. Conversely, the first driving signal STX1 and the second driving signal STX2 can be provided. That is, the first driving signal STX1 can be supplied to the plurality of first sensing lines SL41 to SL4n, and SL51 to SL5n of each of the third-fourth division blocks 340 and the third-fifth division blocks 350, and the second driving signal STX2 can be supplied to the plurality of first sensing lines SL11 to SL1n, SL21 to SL2n, and SL31 to SL3n of each of the third-first division block 310, the third-second division block 320, and the third-third division block 330.

As another example, the sensing driving device 140 can provide the first driving signal STX1 to the plurality of first sensing lines SL11 to SL1n, and SL51 to SL5n of each of the third-first division block 310 and the third-fifth division block 350. The sensing driving device 140 can provide the plurality of first sensing lines SL21 to SL2n, SL31 to SL3n, and SL41 to SL4n of each of the third-second division block 320, the third-third division block 330, and the third-fourth division block 340. Conversely, the first driving signal STX1 and the second driving signal STX2 can be provided. That is, the first driving signal STX1 can be supplied to the plurality of first sensing lines SL21 to SL2n, SL31 to SL3n, and SL41 to SL4n of each of the third-second division block 320, the third-third division block 330, and the third-fourth division block 340, and the second driving signal STX2 can be supplied to the plurality of first sensing lines SL11 to SL1n, and SL51 to SL5n of each of the third-first division block 310 and the third-fifth division block 350.

Meanwhile, the provision of the first driving signal STX1 and the second driving signal STX2 can be changed for each cycle. Here, the cycle can be one frame or each of a plurality of subframes divided within one frame, but is not limited thereto. For example, during a first cycle, the sensing driving device 140 can provide the first driving signal STX1 to the plurality of first sensing lines SL11 to SL1n, SL31 to SL3n, and SL51 to SL5n of each of the third-first division block 310, the third-third division block 330, and the third-fifth division block 350, and provide the second driving signal STX2 to the plurality of the first sensing lines SL21 to SL2n, and SL41 to SL4n of each of the third-second division blocks 320 and the third-fourth division blocks 340. Thereafter, during a second cycle, the sensing driving device 140 can provide the first driving signal STX1 to the plurality of first sensing lines SL21 to SL2n, and SL41 to SL4n of each of the third-second division block 320 and the third-fourth division block 340, and provide the second driving signal STX2 to the plurality of the sensing lines SL11 to SL1n, SL31 to SL3n, and SL51 to SL5n of each of the third-first division block 310, the third-third division block 330, and the third-fifth division block 350. In this way, the first driving signal STX1 and the second driving signal STX2 can be provided for each cycle.

Meanwhile, the sensing driving device 140 can provide the same driving signal to the plurality of first sensing lines SL11 to SL1$n$, SL21 to SL2$n$, SL31 to SL3$n$, SL41 to SL4$n$, and SL51 to SL5$n$ of each of the plurality of third division blocks 310 to 350. For example, the sensing driving device 140 can provide the first driving signal STX1 to each of the plurality of first sensing lines SL11 to SL1$n$ of the third-first division block 310. For example, the sensing driving device 140 can provide the second driving signal STX2 to each of the plurality of first sensing lines SL11 to SL1$n$ of the third-first division block 310.

Meanwhile, the sensing driving device 140 can sequentially provide the first driving signal STX1 or the second driving signal STX2 to the plurality of first sensing lines SL11 to SL1$n$, SL21 to SL2$n$, SL31 to SL3$n$, SL41 to SL4$n$, and SL51 to SL5$n$ of each of the plurality of third division blocks 310 to 350. For example, in the third-first division block 310, after the first driving signal STX1 (or the second driving signal STX2) is provided to the first-first sensing line SL11, the first driving signal STX1 (or the second driving signal STX2) can be provided to the first-second sensing line SL12. This method continues, and in the third-first division block 310, after the first driving signal STX1 (or the second driving signal STX1) is provided to the first-(n−1)th sensing line SL1(n−1), the first driving signal STX1 (or the second driving signal STX2) can be provided to the nth sensing line SL1$n$.

Figure 6:
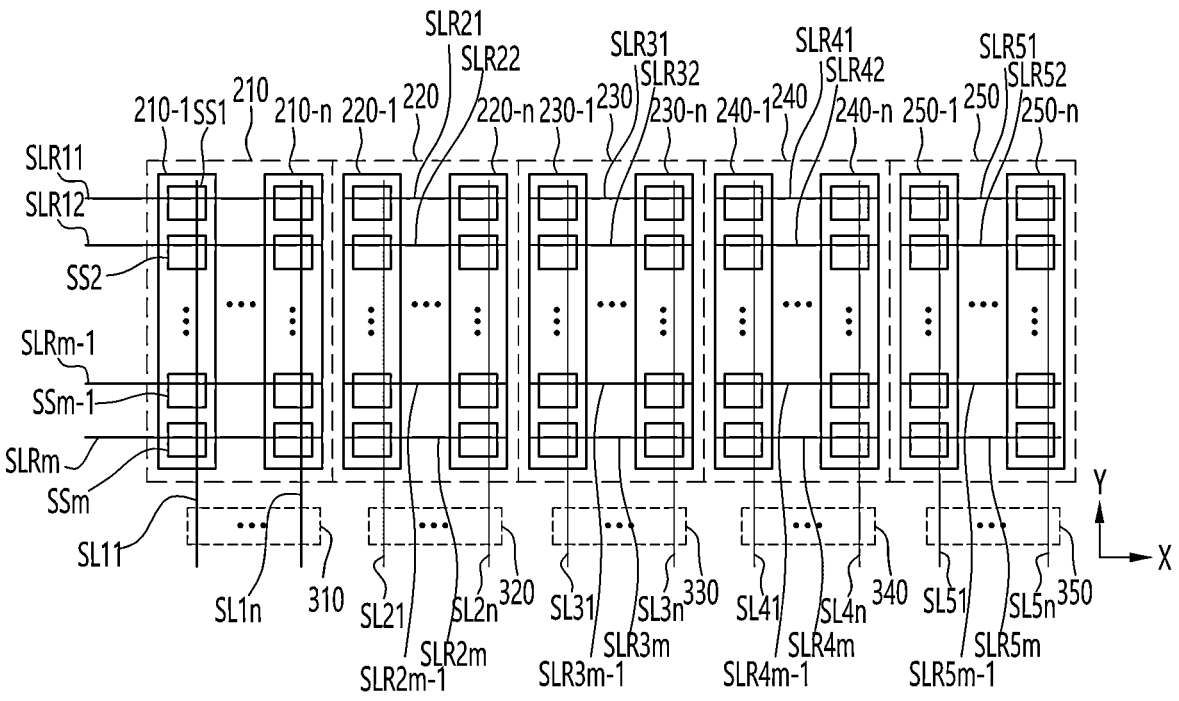
FIG. 6 shows a plurality of first division blocks, a plurality of second division blocks, and a plurality of third division blocks in FIG. 5.

With reference to FIG. 6, the object sensing device 200 according to the embodiment will be described in more detail.

FIG. 6 shows a plurality of first division blocks, a plurality of second division blocks, and a plurality of third division blocks in FIG. 5.

Referring to FIGS. 5 and 6, the plurality of first division blocks 210 to 250 can each comprise a plurality of second division blocks 210-1 to 210-$n$, 220-1 to 220-$n$, 230-1 to 230-$n$, 240-1 to 240-$n$, and 250-1 to 250-$n$ arranged along the first direction. The plurality of second division blocks 210-1 to 210-$n$, 220-1 to 220-$n$, 230-1 to 230-$n$, 240-1 to 240-$n$, and 250-1 to 250-$n$ can each have a rectangular shape, but is not limited thereto. For example, the plurality of second division blocks 210-1 to 210-$n$, 220-1 to 220-$n$, 230-1 to 230-$n$, 240-1 to 240-$n$, and 250-1 to 250-$n$ can each have a minor axis in the first direction and a major axis in the second direction.

For example, the first-first division block 210 can comprise a plurality of second-first to second-nth division blocks 210-1 to 210-$n$ arranged along the first direction. For example, the first-second division block 220 can comprise a plurality of second-first to second-nth division blocks 220-1 to 220-$n$ arranged along the first direction. For example, the first-third division block 230 can comprise a plurality of second-first to second-nth division blocks 230-1 to 230-$n$ arranged along the first direction. For example, the first-fourth division block 240 can comprise a plurality of second-first to second-nth division blocks 240-1 to 240-$n$ arranged along the first direction. For example, the first-fifth division block 250 can comprise a plurality of second-first to second-nth division blocks 250-1 to 250-$n$ arranged along the first direction.

Meanwhile, the plurality of second division blocks 210-1 to 210-$n$, 220-1 to 220-$n$, 230-1 to 230-$n$, 240-1 to 240-$n$, and 250-1 to 250-$n$ can each comprise a plurality of sensing cells SS1 to SS$m$. The plurality of sensing cells SS1 to SS$m$ can be arranged in the second direction that crosses the first direction.

The sensing cells SS1 to SS$m$ can be the minimum unit capable of recognizing a touch by an object or the proximity of an object. The sensing cells SS1 to SS$m$ can comprise the above-described sensing electrode. The sensing electrode can comprise a first sensing electrode and a second sensing electrode, but is not limited thereto. A predetermined capacitance can be formed between the first sensing electrode and the second sensing electrode. The first driving signal STX1 or the second driving signal STX2 can be provided to the first sensing electrode, and the sensing signal can be output from the second sensing electrode. The sensing signal can reflect the changed capacitance value due to touch by an object or proximity to an object.

Meanwhile, the plurality of first sensing lines SL11 to SL1$n$, SL21 to SL2$n$, SL31 to SL3$n$, SL41 to SL4$n$, and SL51 to SL5$n$ of each of the plurality of third division blocks 310 to 350 can each be connected to the plurality of second division blocks 210-1 to 210-$n$, 220-1 to 220-$n$, 230-1 to 230-$n$, 240-1 to 240-$n$, and 250-1 to 250-$n$ of each of the plurality of first division blocks 210 to 250.

For example, the first-first to first-nth sensing lines SL11 to SL1$n$ of the third-first division block 310 can each be connected to the second-first to second-nth division blocks 210-1 to 210-$n$ of the first-first division block 210. For example, the first-first to first-nth sensing lines SL11 to SL1$n$ of the third-first division block 310 can be commonly connected to the plurality of sensing cells SS1 to SS$m$ included in each of the second-first to second-nth division blocks 210-1 to 210-$n$ of the first-first division block 210. The sensing driving device 140 can provide the first driving signal STX1 or the second driving signal STX2 to the plurality of sensing cells SS1 to SS$m$ included in each of the second-first to second-nth division blocks 210-1 to 210-$n$ of the first-first division block 210 through each of the first-first to first-nth sensing lines SL11 to SL1$n$ of the third-first division block 310.

For example, the first-first to first-nth sensing lines SL21 to SL2$n$ of the third-second division block 320 can each be connected to the second-first to second-nth division blocks 220-1 to 220-$n$ of the first-second division block 220. For example, the first-first to first-nth sensing lines SL21 to SL2$n$ of the third-second division block 320 can be commonly connected to the plurality of sensing cells SS1 to SS$m$ included in each of the second-first to second-nth division blocks 220-1 to 220-$n$ of the first-second division block 220. The sensing driving device 140 can provide the first driving signal STX1 or the second driving signal STX2 to the plurality of sensing cells SS1 to SS$m$ included in each of the second-first to second-nth division blocks 220-1 to 220-$n$ of the first-second division block 220 through each of the first-first to first-nth sensing lines SL21 to SL2$n$ of the third-second division block 320.

For example, the first-first to first-nth sensing lines SL31 to SL3$n$ of the third-third division block 330 can each be connected to the second-first to second-nth division blocks 230-1 to 230-$n$ of the first-third division block 230. For example, the first-first to first-nth sensing lines SL31 to SL3$n$ of the third-third division block 330 can be commonly connected to the plurality of sensing cells SS1 to SS$m$ included in each of the second-first to second-nth division blocks 230-1 to 230-$n$ of the first-third division block 230. The sensing driving device 140 can provide the first driving signal STX1 or the second driving signal STX2 to the plurality of sensing cells SS1 to SS$m$ included in each of the second-first to second-nth division blocks 230-1 to 230-$n$ of the first-third division block 230 through each of the first-first to first-nth sensing lines SL31 to SL3$n$ of the third-third division block 330.

For example, the first-first to first-nth sensing lines SL41 to SL4$n$ of the third-fourth division block 340 can each be connected to the second-first to second-nth division blocks 240-1 to 240-$n$ of the first-fourth division block 240. For example, the first-first to first-nth sensing lines SL41 to SL4$n$ of the third-fourth division block 340 can be commonly connected to the plurality of sensing cells SS1 to SSm included in each of the second-first to second-nth division blocks 240-1 to 240-$n$ of the first-fourth division block 240. The sensing driving device 140 can provide the first driving signal STX1 or the second driving signal STX2 to the plurality of sensing cells SS1 to SSm included in each of the second-first to second-nth division blocks 240-1 to 240-$n$ of the first-fourth division block 240 through each of the first-first to first-nth sensing lines SL41 to SL4$n$ of the third-fourth division block 340.

For example, the first-first to first-nth sensing lines SL51 to SL5$n$ of the third-fifth division block 350 can each be connected to the second-first to second-nth division blocks 250-1 to 250-$n$ of the first-fifth division block 250. For example, the first-first to first-nth sensing lines SL51 to SL5$n$ of the third-fifth division block 350 can be commonly connected to the plurality of sensing cells SS1 to SSm included in each of the second-first to second-nth division blocks 250-1 to 250-$n$ of the first-fifth division block 250. The sensing driving device 140 can provide the first driving signal STX1 or the second driving signal STX2 to the plurality of sensing cells SS1 to SSm included in each of the second-first to second-nth division blocks 250-1 to 250-$n$ of the first-fifth division block 250 through each of the first-first to first-nth sensing lines SL51 to SL5$n$ of the third-fifth division block 350.

Meanwhile, the object sensing device 200 according to the first embodiment can comprise a plurality of second sensing lines SLR11 to SLR1$m$, SLR21 to SLR2$m$, SLR31 to SLR3$m$, SLR41 to SLR4$m$, and SLR51 to SLR5$m$. The plurality of second sensing lines SLR11 to SLR1$m$, SLR21 to SLR2$m$, SLR31 to SLR3$m$, SLR41 to SLR4$m$, and SLR51 to SLR5$m$ can be commonly connected to the plurality of second division blocks 210-1 to 210-$n$, 220-1 to 220-$n$, 230-1 to 230-$n$, 240-1 to 240-$n$, and 250-1 to 250-$n$ of each of the plurality of first division blocks 210 to 250.

For example, the plurality of second sensing lines SLR11 to SLR1$m$ can be commonly connected to the plurality of second-first to second-nth division blocks 210-1 to 210-$n$ of the first-first division block 210. For example, the plurality of second sensing lines SLR21 to SLR2$m$ can be commonly connected to the plurality of second-first to second-nth division blocks 220-1 to 220-$n$ of the first-second division block 220. For example, the plurality of second sensing lines SLR31 to SLR3$m$ can be commonly connected to the plurality of second-first to second-nth division blocks 230-1 to 230-$n$ of the first-third division block 230. For example, the plurality of second sensing lines SLR41 to SLR4$m$ can be commonly connected to the plurality of second-first to second-nth division blocks 240-1 to 240-$n$ of the first-fourth division block 240. For example, the plurality of second sensing lines SLR51 to SLR5$m$ can be commonly connected to the plurality of second-first to second-nth division blocks 250-1 to 250-$n$ of the first-fifth division block 250.

For example, each of the plurality of first sensing lines SL11 to SL1$n$, SL21 to SL2$n$, SL31 to SL3$n$, SL41 to SL4$n$, and SL51 to SL5$n$ of the third division blocks 310 to 350 can be connected to the first sensing electrodes of the plurality of sensing cells SS1 to SSm, and the plurality of second sensing lines SLR11 to SLR1$m$, SLR21 to SLR2$m$, SLR31 to SLR3$m$, SLR41 to SLR4$m$, and SLR51 to SLR5$m$ can be connected to the second sensing electrodes of the plurality of sensing cells SS1 to SSm, but is not limited to thereto.

Meanwhile, the sensing driving device 140 can provide the first driving signal STX1 or the second driving signal STX2 to the plurality of second division blocks 210-1 to 210-$n$, 220-1 to 220-$n$, 230-1 to 230-$n$, 240-1 to 240-$n$, and 250-1 to 250-$n$, respectively, and receive sensing signals from the plurality of second division blocks 210-1 to 210-$n$, 220-1 to 220-$n$, 230-1 to 230-$n$, 240-1 to 240-$n$, and 250-1 to 250-$n$.

Specifically, during the first time section, the sensing driving device 140 can provide the first driving signal STX1 or the second driving signal STX2 to the plurality of sensing cells SS1 to SSm on the second-first division block 210-1 of the first-first division block 210 through the first-first sensing line SL11 of the third-first division block 310, and receive sensing signals from each of the plurality of sensing cells SS1 to SSm on the second-first division block 210-1 of the first-first division block 210 through the plurality of second sensing lines SLR11 to SLR1$m$. The sensing signals can be simultaneously received from the plurality of sensing cells SS1 to SSm on the second-first division block 210-1 of the first-first division block 210, but is not limited thereto.

During the second time section, the sensing driving device 140 can provide the first driving signal STX1 or the second driving signal STX2 to the plurality of sensing cells SS1 to SSm on the second-second division block 210-2 of the first-first division block 210 through the first-second sensing line SL12, and receive a sensing signal from each of the plurality of sensing cells SS1 to SSm on the second-second division block 210-2 of the first-first division block 210 through the plurality of second sensing lines SLR11 to SLR1$m$. The sensing signals can be simultaneously received from plurality of sensing cells SS1 to SSm on the second-second division block 210-2 of the first-first division block 210, but is not limited thereto.

In this way, during the $(n-1)$th time section, the sensing driving device 140 can provide the first driving signal STX1 or the second driving signal STX2 to the plurality of sensing cells SS1 to SSm on the second-$(n-1)$th division block 210-$(n-1)$ of the first-first division block 210 through the first-$(n-1)$th sensing line SL1$(n-1)$ of the third-first division block 310, and receive a sensing signal from each of the plurality of sensing cells SS1 to SSm on the second-$(n-1)$th division block 210-$(n-1)$ of the first-first division block 210 through the plurality of second sensing lines SLR11 to SLR1$m$. The sensing signals can be simultaneously received from each of the plurality of sensing cells SS1 to SSm on the second-$(n-1)$th division block 210-$(n-1)$ of the first-first division block 210.

During the n-th time section, the sensing driving device 140 can provide the first driving signal STX1 or the second driving signal STX2 to the plurality of sensing cells SS1 to SSm on the second-nth division block 210-nth of the first-first division block 210 through the first-nth sensing line SL1$n$ of the third-first division block 310, and receive a sensing signal from each of the plurality of sensing cells SS1 to SSm on the second-nth division block 210-nth of the first-first division block 210 through the plurality of second sensing lines SLR11 to SLR1$m$. The sensing signals can be simultaneously received from the plurality of sensing cells SS1 to SSm on the second-nth division block 210-nth of the first-first division block 210.

The first to nth time sections can be included in one frame, but is not limited thereto.

Therefore, each time the first driving signal STX1 or the second driving signal STX2 can be provided to each of the plurality of second-first to second-nth division blocks 210-1 to 220-$n$ of the first-first division block 210, the sensing signals can be simultaneously received from the plurality of sensing cells SS1 to SSm of the second-first to second-nth division blocks 210-1 to 220-$n$. That is, a touch by an object or proximity of an object can be recognized in units of the plurality of second-first to second-nth division blocks 210-1 to 220-$n$ of the first-first division block 210. In this way, the first-second to first-fifth division blocks 220 to 250 can recognize a touch by an object or the proximity of the object in units of the plurality of second-first to second-nth division blocks 210-1 to 220-$n$, respectively.

Meanwhile, during the first time period, the first driving signal STX1 or the second driving signal STX2 can be provided to one of the plurality of second division blocks 210-1 to 210-$n$, 220-1 to 220-$n$, 230-1 to 230-$n$, 240-1 to 240-$n$, and 250-1 to 250-$n$ from each of the plurality of first division blocks 210 to 250. For example, during the first time section, the first driving signal STX1 can be provided to the second-first division block 210-1 of the first-first division block 210, the second-first division block 230-1 of the first-third division block 230, and the second-first division block 250-1 of the fist-fifth division block 250, and the second driving signal STX2 can be provided to the second-first division block 220-1 of the first-second division block 220 and the second-first division block 240-1 of the first-fourth division block 240.

Likewise, the first driving signal (STX1) or the second driving signal (STX2) can be provided to the plurality of second division blocks 210-1 to 210-$n$, 220-1 to 220-$n$, 230-1 to 230-$n$, 240-1 to 240-$n$, and 250-1 to 250-$n$ of each of the plurality of first division blocks 210 to 250 during the second to nth time sections.

Figure 13:
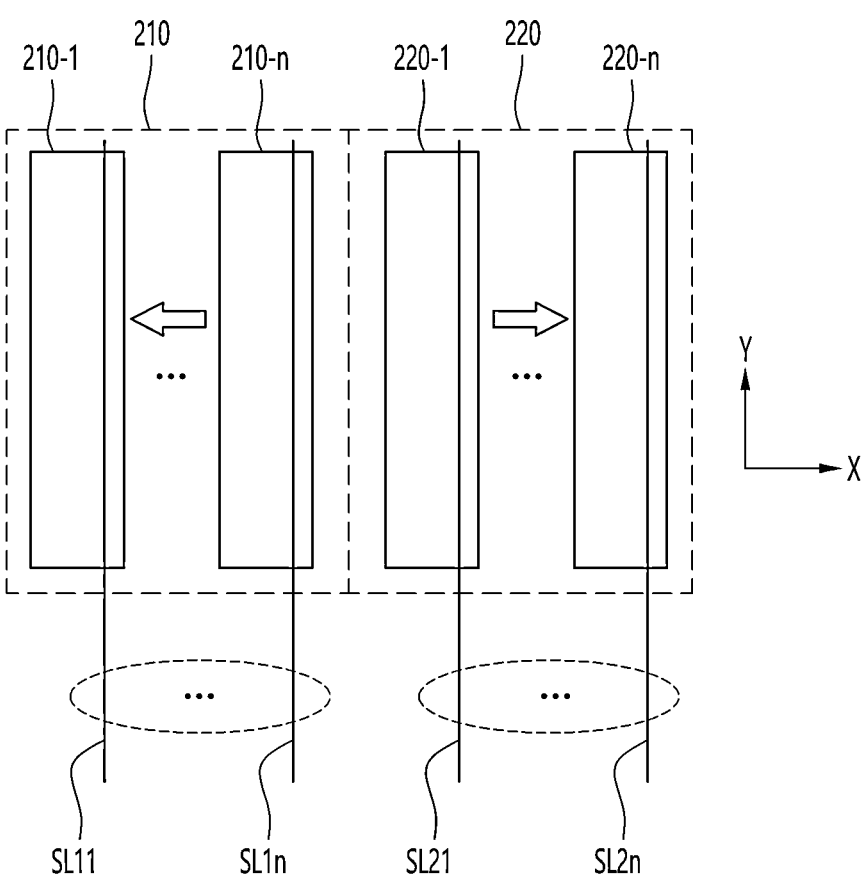
FIG. 13 shows a driving direction of a plurality of second division blocks of each of a first-first division block and a first-second division block according to a third embodiment.
Figure 14:
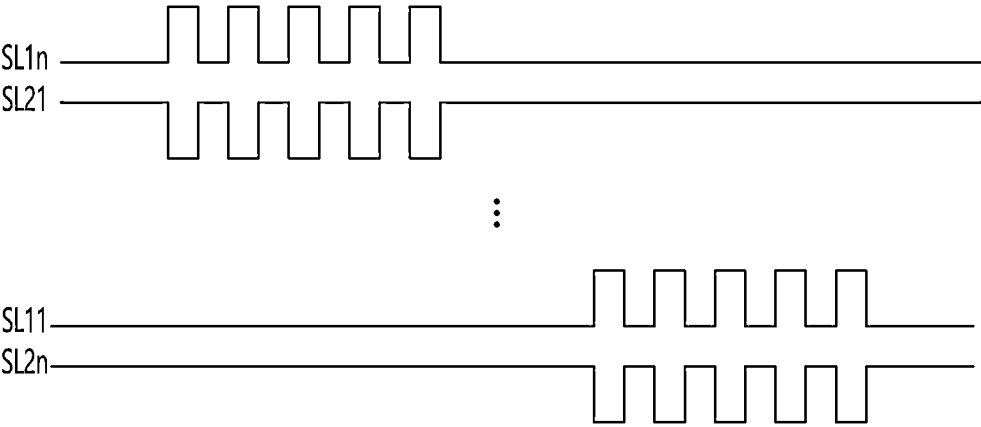
FIG. 14 shows a driving waveform diagram of a plurality of second division blocks of each of a first-first division block and a first-second division block according to a third embodiment.
Figure 15:
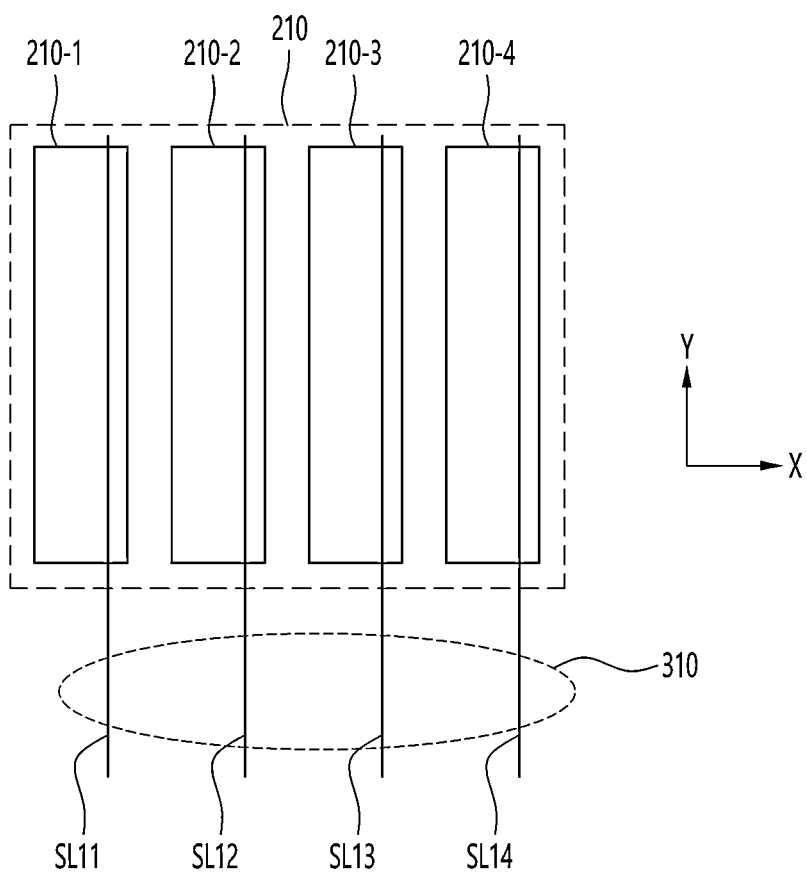
FIG. 15 shows a first-first division block according to a fourth embodiment.

Meanwhile, the sensing driving device 140 can drive the plurality of first division blocks 210 to 250 using a time division multiplexing method (FIGS. 9 to 14). The sensing driving device 140 can drive the plurality of first division blocks 210 to 250 using a code division multiplexing method (FIGS. 15 and 16).

Hereinafter, driving by the time division multiplexing method and the code division multiplexing method will be described in detail with reference to FIGS. 9 to 16. FIGS. 10, 12, and 14 show the first driving signal STX1 provided on the first sensing line SL11 to the nth sensing line SL1$n$ of the third-first division block 310 and the second driving signal STX2 provided on the first sensing line SL21 to the nth sensing line SL2$n$ of the third-second division block 320.

Although FIGS. 9, 11, 13, and 15 show the method for the driving direction of the first driving signal STX1 or the second driving signal STX2 of each of some first division blocks among the plurality of first division blocks 210 to 250, the remaining first division blocks not shown in FIGS. 9, 11, 13, and 15 can be also implemented similarly or identically to the driving direction of the first driving signal STX1 or the second driving signal STX2.

Figure 9:
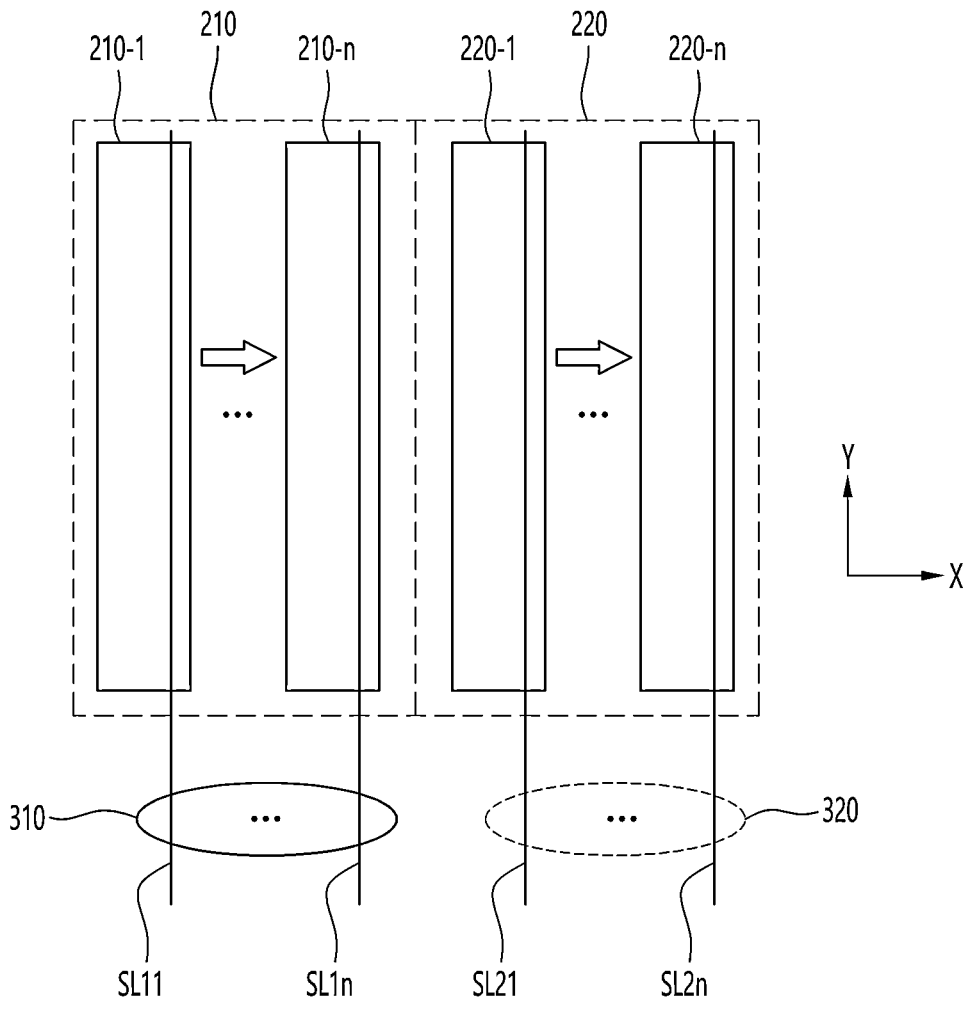
FIG. 9 shows a driving direction of a plurality of second division blocks of each of a first-first division block and a first-second division block according to a first embodiment.
Figure 10:
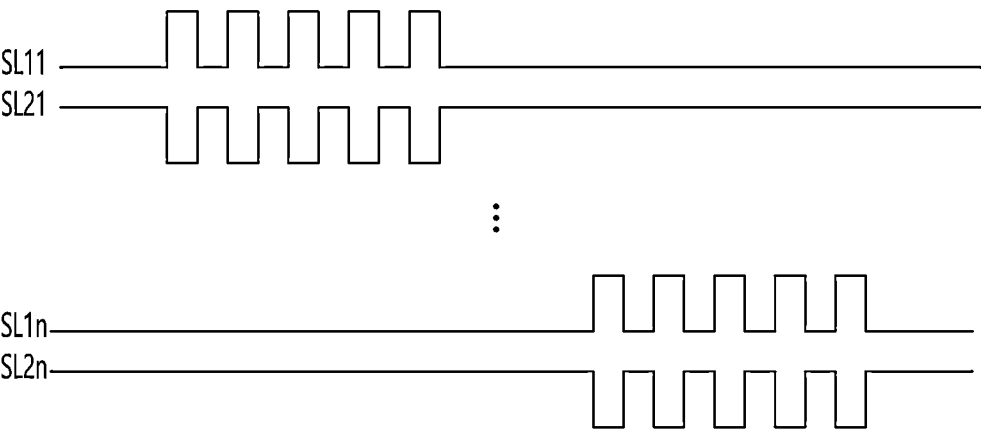
FIG. 10 shows a driving waveform diagram of a plurality of second division blocks of each of a first-first division block and a first-second division block according to a first embodiment.

FIG. 9 shows a driving direction of a plurality of second division blocks of each of a first-first division block and a first-second division block according to the first embodiment. FIG. 10 shows a driving waveform diagram of a plurality of second division blocks of each of a first-first division block and a first-second division block according to the first embodiment.

As shown in FIGS. 9 and 10, the first-first division block 210 and the first-second division block 220 can be positioned adjacent to each other.

For example, it can be arranged in the order of the second-first division block 210-1 to the second-nth division block 210-$n$ in the first-first division block 210 along the first direction. In this instance, it can be arranged in the order of the first-first sensing line SL11 to the first-nth sensing line SL1$n$ in the third-first division block 310 along the first direction. The first-first sensing line SL11 to the first-nth sensing line SL1$n$ can be connected to the second-first division block 210-1 to the second-nth division block 210-$n$, respectively.

For example, it can be arranged in the order of the second-first division block 210-1 to the second-nth division block 210-$n$ in the first-second division block 220 along the first direction. In this instance, it can be arranged in the order of the second-first sensing line SL21 to the second-nth sensing line SL2$n$ in the third-second division block 320 along the first direction. The second-first sensing line SL21 to the second-nth sensing line SL2$n$ can be connected to the second-first division block 220-1 to the second-nth division block 220-$n$, respectively.

Meanwhile, the second-first division block 210-1 to the second-nth division block 210-$n$ of the first-first division block 210 and the second-first division block 220-1 to the second-nth division block 220-$n$ of the first-second division block 220 can be driven sequentially along the same direction. That is, the second-first division block 210-1 to the second-nth division block 210-$n$ of the first-first division block 210 and the second-first division block 220-1 to the second-nth division block 220-$n$ of the first-second division block 220 can be sequentially driven from the left side (first side) to the right side (second side). They can also be driven in the opposite direction. For example, the first-first division block 210 and the first-second division block 220 can be driven in the order of the second-first division block 210-1 and 220-1 to the second-nth division block 210-$n$ and 220-$n$, respectively.

Specifically, as shown in FIGS. 9 and 10, the first driving signal STX1 can be provided to the second-first division block 210-1 of the first-first division block 210, and the second driving signal STX2 can be provided to the second-first division block 220-1 of the first-second division block 220. At this time, the first driving signal STX1 and the second driving signal STX2 can be provided to the second-first division block 210-1 of the first-first division block 210 and the second-first division block 220-1 of the first-second division block 220 at the same time, but is not limited thereto. Accordingly, a sensing signal can be received from each of the plurality of sensing cells SS1 to SSm included in the second-first division block 210-1 of the first-first division block 210, and a sensing signal can be received from each of the plurality of sensing cells SS1 to SSm included in the second-first division block 220-1 of the first-second division block 220.

Afterwards, the first driving signal STX1 can be provided to the second-second division block 210-2 of the first-first division block 210, and the second driving signal STX2 can be provided to the second-second division block 210-2 of the first-second division block 220. At this time, the first driving signal STX1 and the second driving signal STX2 can be provided to the second-second division block 210-2 of the first-first division block 210 and the second-second division block 210-2 of the first-second division block 220, but is not limited thereto. Accordingly, a sensing signal can be received from each of the plurality of sensing cells SS1 to SSm included in the second-second division block 210-2 of the first-first division block 210, and a sensing signal can be received from each of the plurality of sensing cells SS1 to SSm included in the second-second division block 210-2 of the first-second division block 220.

The operation can be repeated in this way. Finally, the first driving signal STX1 can be provided to the second-nth division block 210-n of the first-first division block 210, and the second driving signal STX2 can be provided to the second-nth division block 220-n of the first-second division block 220. At this time, the first driving signal STX1 and the second driving signal STX2 can be provided to the second-nth division block 210-n of the first-first division block 210 and the second-nth division block 220-n of the first-second division block 220, but is not limited thereto. Accordingly, a sensing signal can be received from each of the plurality of sensing cells SS1 to SSm included in the second-nth division block 210-n of the first-first division block 210, and a sensing signal can be received from each of the plurality of sensing cells SS1 to SSm included in the second-nth division block 220-n of the first-second division block 220.

Figure 11:
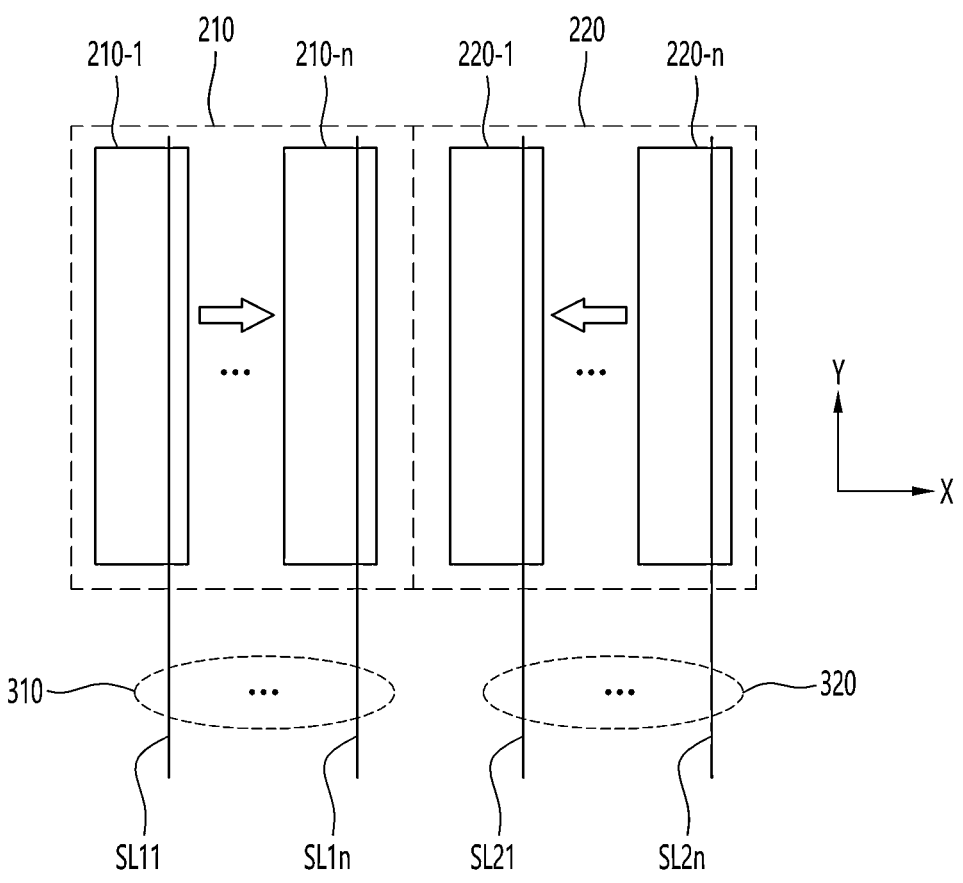
FIG. 11 shows a driving direction of a plurality of second division blocks of each of a first-first division block and a first-second division block according to a second embodiment.
Figure 12:
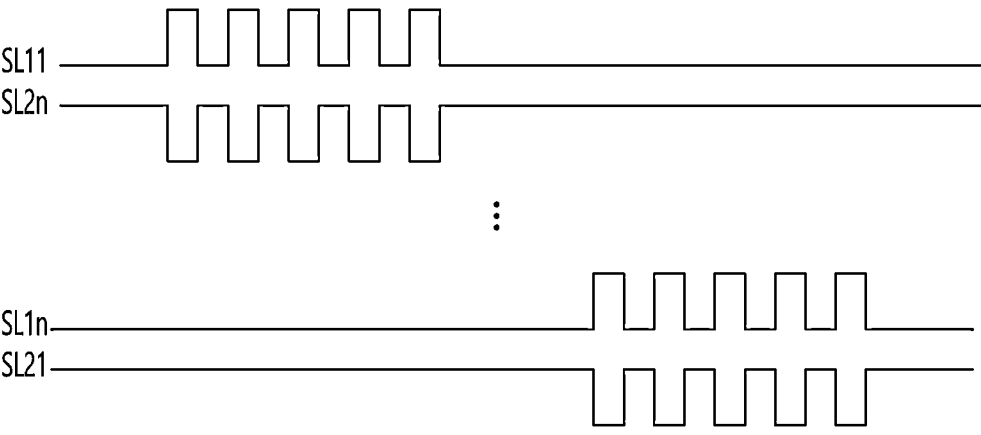
FIG. 12 shows a driving waveform diagram of a plurality of second division blocks of each of a first-first division block and a first-second division block according to a second embodiment.

FIG. 11 shows a driving direction of a plurality of second division blocks of each of a first-first division block and a first-second division block according to the second embodiment. FIG. 12 shows a driving waveform diagram of a plurality of second division blocks of each of a first-first division block and a first-second division block according to the second embodiment.

As shown in FIGS. 11 and 12, the second-first division block 210-1 to the second-nth division block 210-n of the first-first division block 210 and the second-first division block 220-1 to the second-nth division block 220-n of the first-second division block 220 can be driven sequentially along a direction in which they approach each other. That is, the second-first division block 210-1 to the second-nth division block 210-n of the first-first division block 210 can be driven sequentially from the left side (first side) to the right side (second side), and the second-first division block 220-1 to the second-nth division block 220-n of the first-second division block 220 can be driven sequentially from the right side to the left side. For example, the first-first division block 210 can be driven in the order of the second-first division block 210-1 to the second-nth division block 210-n, and the first-second division block 220 can be driven in the order of the second-nth division block 220-n to the second-first division block 220-1.

Specifically, the first driving signal STX1 can be provided to the second-first division block 210-1 of the first-first division block 210, and the second driving signal STX2 can be provided to the second-nth division block 220-n of the first-second division block 220. At this time, the first driving signal STX1 and the second driving signal STX2 can be provided to the second-first division block 210-1 of the first-first division block 210 and the second-nth division block 220-n of the first-second division block 220 at the same time, but is not limited thereto. Accordingly, a sensing signal can be received from each of the plurality of sensing cells SS1 to SSm included in the second-first division block 210-1 of the first-first division block 210, and a sensing signal can be received from each of the plurality of sensing cells SS1 to SSm included in the second-nth division block 220-n of the first-second division block 220.

Afterwards, the first driving signal STX1 can be provided to the second-second division block 210-2 of the first-first division block 210, and the second driving signal STX2 can be provided to the second-nth division block 220-n of the first-second division block 220. At this time, the first driving signal STX1 and the second driving signal STX2 can be provided to the second-second division block 210-2 of the first-first division block 210 and the second-nth division block 220-n of the first-second division block 220, but is not limited thereto. Accordingly, a sensing signal can be received from each of the plurality of sensing cells SS1 to SSm included in the second-second division block 210-2 of the first-first division block 210, and a sensing signal can be received from each of the plurality of sensing cells SS1 to SSm included in the second-nth division block 220-n of the first-second division block 220.

The operation can be repeated in this way. Finally, the first driving signal STX1 can be provided to the second-nth division block 210-n of the first-first division block 210, and the second driving signal STX2 can be provided to the second-first division block 220-1 of the first-second division block 220. At this time, the first driving signal STX1 and the second driving signal STX2 can be provided to the second-nth division block 210-n of the first-first division block 210 and the second-first division block 220-1 of the first-second division block 220, but is not limited thereto. Accordingly, a sensing signal can be received from each of the plurality of sensing cells SS1 to SSm included in the second-nth division block 210-n of the first-first division block 210, and a sensing signal can be received from each of the plurality of sensing cells SS1 to SSm included in the second-first division block 220-1 of the first-second division block 220.

FIG. 13 shows a driving direction of a plurality of second division blocks of each of a first-first division block and a first-second division block according to a third embodiment. FIG. 14 shows a driving waveform diagram of a plurality of second division blocks of each of a first-first division block and a first-second division block according to a third embodiment.

As shown in FIGS. 13 and 14, the second-first division block 210-1 to the second-nth division block 210-n of the first-first division block 210 and the second-first division block 220-1 to the second-nth division block 220-n of the first-second division block 220 can be driven sequentially along directions away from each other. That is, the second-first division block 210-1 to the second-nth division block 210-n of the first-first division block 210 can be driven sequentially from the right side (second side) to the left side (first side), and the second-first division block 220-1 to the second-nth division block 220-n of the first-second division block 220 can be driven sequentially from the left to the right. For example, the first-first division block 210 can be driven in the order of the second-nth division block 210-n to the second-first division block 210-1, and the first-second division block 220 can be driven in the order of the second-first division block 210-1 to the second-nth division block 210-n.

Specifically, as shown in FIGS. 13 and 14, the first driving signal STX1 can be provided to the second-nth division block 210-n of the first-first division block 210, and the second driving signal STX2 can be provided to the second-first division block 220-1 of the first-second division block 220. At this time, the first driving signal STX1 and the second driving signal STX2 can be provided to the second-nth division block 210-n of the first-first division block 210 and the second-first division block 220-1 of the first-second division block 220, but is not limited thereto. Accordingly, a sensing signal can be received from each of the plurality of sensing cells SS1 to SSm included in the second-nth division block 210-n of the first-first division block 210, and a sensing signal can be received from each of the plurality of sensing cells SS1 to SSm included in the second-first division block 220-1 of the first-second division block 220.

Afterwards, the first driving signal STX1 can be provided to the second-(n−1)th division block 210-(n−1) of the first-first division block 210, and the second driving signal STX2 can be provided to the second-second division block 220-2 of the first-second division block 220. At this time, the first driving signal STX1 and the second driving signal STX2 can be provided to the second-(n−1)th division block 210-(n−1) of the first-first division block 210 and the second-second division block 220-2 of the first-second division block 220 at the same time, but is not limited thereto. Accordingly, a sensing signal can be received from each of the plurality of sensing cells SS1 to SSm included in the second-(n−1)th division block 210-(n−1) of the first-first division block 210, and a sensing signal can be received from each of the plurality of sensing cells SS1 to SSm included in the second-second division block 220-2 of the first-second division block 220.

The operation can be repeated in this way. Finally, the first driving signal STX1 can be provided to the second-first division block 210-1 of the first-first division block 210, and the second driving signal STX2 can be provided to the second-nth division block 220-n of the first-second division block 220. At this time, the first driving signal STX1 and the second driving signal STX2 can be provided to the second-first division block 210-1 of the first-first division block 210 and the second-nth division block 220-n of the first-second division block 220 at the same time, but is not limited thereto. Accordingly, a sensing signal can be received from each of the plurality of sensing cells SS1 to SSm included in the second-first division block 210-1 of the first-first division block 210, and a sensing signal can be received from each of the plurality of sensing cells SS1 to SSm included in the second-nth division block 220-n of the first-second division block 220.

FIG. 15 shows a first-first division block according to a fourth embodiment. FIG. 16 is a table of an example of a code division multiplexing method for driving second-first to second-fourth division blocks of a first-first division block according to the fourth embodiment. FIG. 15 shows that the first-first division block 210 includes four second division blocks, that is, the second-first to second-fourth division blocks 240-1 to 240-n to drive the first-first division block 210 using four channels, but the number of second division blocks included in the first-first division block 210 can vary depending on the number of channels.

As shown in FIGS. 15 and 16, each of the second-first division block 210-1 to the second-fourth division block 210-4 using each of the first channel 1ch, the second channel 2ch, the third channel 3ch, and the fourth channel 4ch can be driven Each channel can be configured according to a 4-bit code value. These code values can be provided by a microcontroller unit (MCU) or timing controller. The code values shown in FIG. 16 can be one example and can be changed.

For example, the first channel 1ch can be configured by the code value of '1110', the second channel 2ch can be configured by the code value of '1101', the third channel 3ch can be configured by the code value of '1011', the fourth channel 4ch can be configured according to the code value of '0111'. For example, '1' can mean the supply of the first driving signal STX1, and '0' can mean the supply of the second driving signal STX2, but is not limited thereto.

In this instance, when operating the first channel 1ch, the second-first division block 210-1 to the second-fourth division block 210-4 of the first-first division block 210 according ing to the code value of '1110' each can be driven. Specifically, the first driving signal STX1 can be provided to the second-first division block 210-1, the second-second division block 210-2, and the second-third division block 210-3 of the first-first division block 210, respectively, and the second driving signal STX2 can be provided to the second-fourth division block 210-4 of the first-first division block 210.

When operating the second channel 2ch, the second-first division block 210-1 to the second-fourth division block 210-4 of the first-first division block 210 each can be driven according to the code value of '1101'. Specifically, the first driving signal STX1 can be provided to the second-first division block 210-1, the second-second division block 210-2, and the second-fourth division block 210-4, respectively, of the first-first division block 210, and the second driving signal STX2 can be provided to the second-third division block 210-3 of the first-first division block 210.

When operating the third channel 3ch, the second-first division block 210-1 to the second-fourth division block 210-4 of the first-first division block 210 each can be driven according to the code value of '1011'. Specifically, the first driving signal STX1 can be provided to the second-first division block 210-1, the second-third division block 210-3, and the second-fourth division block 210-, respectively, of the first-first division block 210, and the second driving signal STX2 can be provided to the second-second division block 210-2 of the first-first division block 210.

When operating the fourth channel 4ch, the second-first division block 210-1 to the second-fourth division block 210-4 of the first-first division block 210 each can be driven according to the code value of '0111'. Specifically, the first driving signal STX1 can be provided to the second-second division block 210-2, the second-third division block 210-3, and the second-fourth division block 210-4 of the first-first division block 210, respectively, of the first-first division block 210, and the second driving signal STX2 can be provided to the second-first division block 210-1 of the first-first division block 210.

The first-second to first-fifth division blocks (220 to 250 in FIG. 5) can also be driven in the same or similar manner as the first-first division block 210 using a code division multiplexing method.

Figure 17:
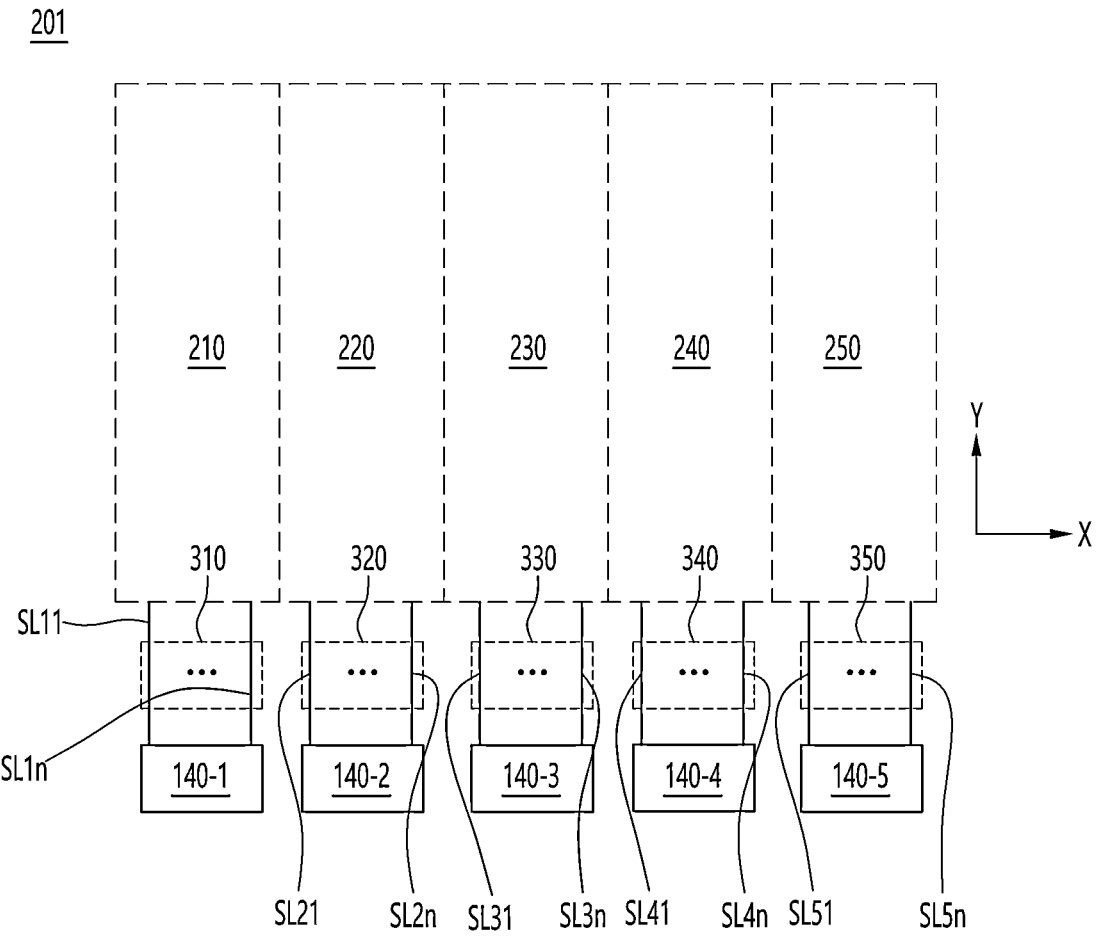
FIG. 17 shows an object sensing device according to a second embodiment.

FIG. 17 shows an object sensing device according to a second embodiment.

The second embodiment is the same as the first embodiment (FIG. 5) except for a plurality of sensing driving devices 140-1 to 140-5. In the second embodiment, components having the same shape, structure, and/or function as those of the first embodiment are given the same reference numerals and detailed descriptions are omitted.

Referring to FIG. 17, the object sensing device 201 according to the second embodiment comprises a plurality of first division blocks 210 to 250 and a plurality of sensing driving devices 140-1 to 140-5.

The drawing shows five sensing driving devices 140-1 to 140-5, but fewer or more sensing driving devices can be provided.

The plurality of sensing driving devices 140-1 to 140-5 can correspond to the plurality of first division blocks 210 to 250, respectively. For example, the first sensing driving device 140-1 can be connected to the first-first division block 210. The second sensing driving device 140-2 can be connected to the first-second division block 220. The third sensing driving device 140-3 can be connected to the first-third division block 230. The fourth sensing driving device 140-4 can be connected to the first-fourth division block 240. The fifth sensing driving device 140-5 can be connected to the first-fifth division block 250.

Meanwhile, the object sensing device 201 according to the second embodiment can comprise a plurality of third division blocks 310 to 350. The plurality of third division blocks 310 to 350 can each comprise a plurality of first sensing lines SL11 to SL1$n$, SL21 to SL2$n$, SL31 to SL3$n$, SL41 to SL4$n$, and SL51 to SL5$n$. The first driving signal STX1 or the second driving signal STX2 can be provided through the plurality of first sensing lines SL11 to SL1$n$, SL21 to SL2$n$, SL31 to SL3$n$, SL41 to SL4$n$, and SL51 to SL5$n$.

In this instance, the third-first division block 310 can be connected between the first-first division block 210 and the first sensing driving device 140-1. The third-second division block 320 can be connected between the first-second division block 220 and the second sensing driving device 140-2. The third-third division block 330 can be connected between the first-third division block 230 and the third sensing driving device 140-3. The third-fourth division block 340 can be connected between the first-fourth division block 240 and the fourth sensing driving device 140-4. The third-fifth division block 350 can be connected between the first-fifth division block 250 and the fifth sensing driving device 140-5.

The first sensing driving device 140-1 can provide the first driving signal STX1 or the second driving signal STX2 to the first-first division block 210 through the plurality of first sensing lines SL11 to SL1$n$ of the third-first division block 310. The second sensing driving device 140-2 can provide the first driving signal STX1 or the second driving signal STX2 to the first-second division block 220 through the plurality of first sensing lines SL21 to SL2$n$ of the third-second division block 320. The third sensing driving device 140-3 can provide the first driving signal STX1 or the second driving signal STX2 to the first-third division block 230 through the plurality of first sensing lines SL31 to S3$n$ of the third-third division block 330. The fourth sensing driving device 140-4 can provide the first driving signal STX1 or the second driving signal STX2 to the first-fourth division blocks 240 through the plurality of first sensing lines SL41 to S4$n$ of the third-fourth division block 340. The fifth sensing driving device 140-5 can provide the first driving signal STX1 or the second driving signal STX2 to the first to fifth division blocks 250 through the plurality of first sensing lines SL51 to S5$n$ of the third-fifth division block 350.

Meanwhile, as shown in FIG. 6, a plurality of second sensing lines SLR11 to SLR1$m$, SLR21 to SLR2$m$, SLR31 to SLR3$m$, SLR41 to SLR4$m$, and SLR51 to SLR5$m$ can be provided.

For example, the first sensing driving device 140-1 can receive a sensing signal generated in the first-first division block 210 through each of the plurality of second sensing lines SLR11 to SLR1$m$ connected to the first-first division block 210. For example, the second sensing driving device 140-2 can receive a sensing signal generated in the first-second division block 220 through each of the plurality of second sensing lines SLR21 to SLR2$m$ connected to the first-second division block 220. For example, the third sensing driving device 140-3 can receive a sensing signal generated in the first-third division block 230 through each of the plurality of second sensing lines SLR31 to SLR3$m$ connected to the first-third division block 230.

For example, the fourth sensing driving device 140-4 can receive a sensing signal generated in the first-fourth division block 240 through each of the plurality of second sensing lines SLR41 to SLR4$m$ to be connected to the first-fourth division block 240. For example, the fifth sensing driving device 140-5 can receive a sensing signal generated in the first-fifth division block 250 through each of the plurality of second sensing lines SLR51 to SLR5$m$ connected to the first-fifth division block 250.

According to the embodiment, a plurality of sensing driving devices 140-1 to 140-5 can be provided. The plurality of sensing driving devices 140-1 to 140-5 can be provided to correspond to the plurality of first division blocks 210 to 250. Each of the plurality of sensing driving devices 140-1 to 140-5 can provide a first driving signal STX1 or a second driving signal STX2 to the corresponding first division block 210 to 250 and receive sensing signals from the corresponding first division block 210 to 250.

Although not shown in the drawing, the number of sensing driving devices 140-1 to 140-5 can be smaller than the number of the plurality of first division blocks 210 to 250. In this instance, one sensing driving device can drive two or more first division blocks.

The above detailed description should not be construed as limiting in all respects and should be considered illustrative. The scope of the embodiment should be determined by reasonable interpretation of the appended claims, and all changes within the equivalent range of the embodiment are included in the scope of the embodiment.

What is claimed is:

1. An object sensing device, comprising:
   a plurality of first division blocks divided along a first direction, wherein each of the plurality of first division blocks comprises a plurality of second division blocks arranged along the first direction; and
   at least one sensing driving device configured to simultaneously drive the plurality of second division blocks of the each of the plurality of first division blocks during one frame,
   wherein the at least one sensing driving device is configured to:
     provide a first driving signal to two or more first division blocks among the plurality of first division blocks; and
     provide a second driving signal to the plurality of first division blocks excluding the two or more first division blocks, and
   wherein the first driving signal and the second driving signal are different.

2. The object sensing device of claim 1, wherein the first driving signal and the second driving signal have polarities inverted from each other.

3. The object sensing device of claim 1, wherein the first driving signal and the second driving signal are symmetrical to each other with respect to a reference signal.

4. The object sensing device of claim 1,
   wherein each of the plurality of second division blocks comprises a plurality of sensing cells arranged in a second direction crossing the first direction.

5. The object sensing device of claim 4, wherein the at least one sensing driving device is configured to drive the each of the plurality of first division blocks using a time division multiplexing method.

6. The object sensing device of claim 4, wherein the at least one sensing driving device is configured to:
   drive the each of the plurality of first division blocks using a code division multiplexing method, and
   wherein when using the code division multiplexing method, at least one second division block among the plurality of second division blocks of the each of the plurality of first division blocks is configured to provide the first driving signal, and the plurality of second division blocks excluding the at least one second division block are configured to provide the second driving signal, for each of a plurality of channels.

7. The object sensing device of claim 4, further comprising:

a plurality of third division blocks each of which corresponds to one of the plurality of first division blocks, wherein the at least one sensing driving device is configured to drive the plurality of first division blocks through the plurality of third division blocks.

8. The object sensing device of claim 7, wherein each of the plurality of third division blocks comprises a plurality of sensing lines, wherein the plurality of sensing lines are each connected to the plurality of second division blocks, and wherein the at least one sensing driving device is configured to provide the first driving signal or the second driving signal to the plurality of sensing cells in each of the plurality of second division blocks.

9. The object sensing device of claim 1, wherein the at least one sensing driving device comprises a plurality of sensing driving devices each corresponding to the plurality of first division blocks.

10. An object sensing device, comprising:

a plurality of first division blocks divided along a first direction, wherein each of the plurality of first division blocks comprises a plurality of second division blocks arranged along the first direction; and a plurality of sensing driving devices corresponding to the plurality of first division blocks configured to simultaneously drive the plurality of second division blocks of the each of the plurality of first division blocks during one frame, wherein two or more sensing driving devices among the plurality of sensing driving devices are configured to:

provide a first driving signal to two or more first division blocks among the plurality of first division blocks, and provide a second driving signal to the plurality of first division blocks excluding the two or more first division blocks, and wherein the first driving signal and the second driving signal are different.

11. The object sensing device of claim 10, wherein the first driving signal and the second driving signal have polarities inverted from each other.

12. The object sensing device of claim 10, wherein the first driving signal and the second driving signal are symmetrical to each other with respect to a reference signal.

13. The object sensing device of claim 10, wherein each of the plurality of second division blocks comprises a plurality of sensing cells arranged in a second direction crossing the first direction.

14. The object sensing device of claim 13, wherein the plurality of sensing driving devices is configured to drive the each of the plurality of first division blocks using a time division multiplexing method.

15. A display device, comprising:

a panel comprising a plurality of first division blocks divided along a first direction, wherein each of the plurality of first division blocks comprises a plurality of second division blocks arranged along the first direction; and a sensing driving device configured to simultaneously drive the plurality of second division blocks of the each of the plurality of first division blocks during one frame, wherein the sensing driving device is configured to:

provide a first driving signal to two or more first division blocks among the plurality of first division blocks and provide a second driving signal to plurality of first division blocks excluding the two or more first division blocks, and wherein the first driving signal and the second driving signal are different.

16. The display device of claim 15, wherein the first driving signal and the second driving signal have polarities inverted from each other.

17. The display device of claim 15, wherein the first driving signal and the second driving signal are symmetrical to each other with respect to a reference signal.

18. The display device of claim 15, wherein each of the plurality of second division blocks comprises a plurality of sensing cells arranged in a second direction crossing the first direction.

* * * * *